(12) United States Patent  
Basiri

(10) Patent No.: US 12,490,923 B2  
(45) Date of Patent: Dec. 9, 2025

(54) METHODS AND DEVICES FOR MEASURING STRUCTURAL AND FUNCTIONAL PROPERTIES OF TISSUE

(71) Applicant: Bioxytech Retina, Inc., Richmond, CA (US)

(72) Inventor: Ali Basiri, Pleasant Hill, CA (US)

(73) Assignee: Bioxytech Retina, Inc., Pleasant Hill, CA (US)

( * ) Notice: Subject to any disclaimer, the term of this patent is extended or adjusted under 35 U.S.C. 154(b) by 570 days.

(21) Appl. No.: 17/139,898

(22) Filed: Dec. 31, 2020

(65) Prior Publication Data

US 2022/0202325 A1 Jun. 30, 2022

(51) Int. Cl.
*A61B 5/1455* (2006.01)
*A61B 5/00* (2006.01)
(Continued)

(52) U.S. Cl.
CPC ........ *A61B 5/14555* (2013.01); *A61B 5/4088* (2013.01); *A61B 5/7257* (2013.01);
(Continued)

(58) Field of Classification Search
CPC . A61B 5/14555; A61B 5/4088; A61B 5/7257; A61B 5/4842; A61B 5/145;
(Continued)

(56) References Cited

U.S. PATENT DOCUMENTS 5,822,035 A 10/1998 Bille
6,819,949 B2 11/2004 Smith et al.
(Continued)

FOREIGN PATENT DOCUMENTS

WO WO-9948418 A1 * 9/1999 .......... A61B 3/1241
WO WO-2014146053 A2 9/2014
(Continued)

OTHER PUBLICATIONS

UCLA Health, "For diabetics, blurry vision is cause for concern", published on Nov. 29, 2017, published at https://www.uclahealth.org/news/for-diabetics-blurry-vision-is-cause-for-concern (Year: 2017).*
(Continued)

*Primary Examiner* — Jennifer Robertson
*Assistant Examiner* — Jonathan Drew Moroneso
(74) *Attorney, Agent, or Firm* — FisherBroyles, LLP; John K. Shimmick

(57) ABSTRACT

Provided herein are methods and systems for determining a parameter across a surface of a tissue such as a retinal tissue of an eye of a subject. In some cases, the determined parameter is tissue oxygenation which can be used for a variety of clinical applications such as diagnosing and/or modeling a disease in the subject. In some examples, the method is performed by detecting one or more optical signals from the tissue using an optical detector, and processing the detected optical signals to characterize and map the parameter across the surface of the tissue. The methods and systems provided herein can prove accurate physics-based models of parameters such as tissue oxygenation across a heterogeneous tissue surface.

17 Claims, 15 Drawing Sheets

(51) Int. Cl.
| | |
|---|---|
| *A61B 5/145* | (2006.01) |
| *G01N 33/49* | (2006.01) |
| *G16H 10/60* | (2018.01) |
| *G16H 15/00* | (2018.01) |
| *G16H 50/20* | (2018.01) |
| *G16H 50/30* | (2018.01) |
| *G16H 50/50* | (2018.01) |
| *G16H 50/70* | (2018.01) |

(52) U.S. Cl.
CPC ......... *G01N 33/4925* (2013.01); *G16H 10/60* (2018.01); *G16H 15/00* (2018.01); *G16H 50/20* (2018.01); *G16H 50/30* (2018.01); *G16H 50/50* (2018.01); *G16H 50/70* (2018.01); *A61B 5/145* (2013.01); *A61B 5/72* (2013.01); *A61B 5/7235* (2013.01)

(58) Field of Classification Search
CPC .... A61B 5/72; A61B 5/7235; G01N 33/4925; G16H 10/60; G16H 15/00; G16H 50/20; G16H 50/30; G16H 50/50; G16H 50/70
See application file for complete search history.

(56) References Cited

U.S. PATENT DOCUMENTS

| | | | |
|---|---|---|---|
| 6,958,815 | B2 | 10/2005 | Bevilacqua et al. |
| 7,333,842 | B2 | 2/2008 | Schweitzer et al. |
| 7,575,321 | B2 | 8/2009 | Newman et al. |
| 8,109,634 | B2 | 2/2012 | Gil |
| 8,308,299 | B2 | 11/2012 | Ramella-Roman et al. |
| 8,382,284 | B2 | 2/2013 | Munger et al. |
| 8,491,120 | B2 | 7/2013 | Kahn et al. |
| 8,706,178 | B2 | 4/2014 | Denninghoff et al. |
| 8,892,192 | B2 | 11/2014 | Cuccia et al. |
| 9,078,602 | B2 | 7/2015 | Plaian et al. |
| 9,220,412 | B2 | 12/2015 | Cuccia |
| 9,274,047 | B2 | 3/2016 | Velten et al. |
| 9,277,866 | B2 | 3/2016 | Cuccia |
| 10,694,985 | B2 | 6/2020 | Basiri |
| 2002/0188203 | A1 | 12/2002 | Smith et al. |
| 2003/0088165 | A1 | 5/2003 | Smith et al. |
| 2003/0123047 | A1 | 7/2003 | Pettersson et al. |
| 2005/0288565 | A1 | 12/2005 | Kerr |
| 2006/0058683 | A1 | 3/2006 | Chance |
| 2007/0219439 | A1 | 9/2007 | Vilser et al. |
| 2007/0238957 | A1 | 10/2007 | Yared |
| 2009/0099428 | A1 | 4/2009 | Munger et al. |
| 2009/0153798 | A1 | 6/2009 | Dick et al. |
| 2010/0030042 | A1 | 2/2010 | Denninghoff et al. |
| 2010/0085537 | A1 | 4/2010 | Ramella-Roman et al. |
| 2010/0094135 | A1 | 4/2010 | Fang-Yen et al. |
| 2010/0141829 | A1* | 6/2010 | Jalali ................. A61B 1/00193 382/280 |
| 2010/0191081 | A1 | 7/2010 | Shahidi |
| 2010/0210931 | A1 | 8/2010 | Cuccia et al. |
| 2010/0238404 | A1 | 9/2010 | Newman et al. |
| 2011/0013002 | A1* | 1/2011 | Thompson ............. A61B 5/445 382/128 |
| 2011/0043756 | A1 | 2/2011 | Kahn et al. |
| 2012/0070369 | A1 | 3/2012 | Iliopoulos et al. |
| 2012/0093389 | A1* | 4/2012 | Halldorsson ....... A61B 5/14555 382/134 |
| 2012/0224758 | A1 | 9/2012 | Treece et al. |
| 2013/0128225 | A1 | 5/2013 | Wall et al. |
| 2013/0253338 | A1 | 9/2013 | Kang et al. |
| 2015/0100345 | A1 | 4/2015 | Holmes et al. |
| 2015/0116476 | A1 | 4/2015 | Kang |
| 2015/0141839 | A1 | 5/2015 | Cuccia et al. |
| 2015/0148636 | A1 | 5/2015 | Benaron |
| 2015/0201872 | A1 | 7/2015 | Benni |
| 2016/0110584 | A1 | 4/2016 | Remiszewski et al. |
| 2016/0120404 | A1 | 5/2016 | Jordan et al. |
| 2016/0132726 | A1 | 5/2016 | Kempinski et al. |
| 2016/0270665 | A1 | 9/2016 | Kantor et al. |
| 2016/0302669 | A1 | 10/2016 | Cuccia |
| 2016/0345835 | A1 | 12/2016 | Darty |
| 2017/0127988 | A1* | 5/2017 | Tao ...................... A61B 5/7257 |
| 2018/0085040 | A1* | 3/2018 | Ferber .................. A61B 5/7278 |
| 2018/0153455 | A1* | 6/2018 | Guazzi .............. A61B 5/02416 |
| 2018/0214088 | A1* | 8/2018 | Newberry ............ A61B 5/6817 |
| 2018/0289293 | A1 | 10/2018 | Basiri |
| 2018/0310828 | A1* | 11/2018 | DiMaio ................ A61B 5/0075 |
| 2020/0237303 | A1* | 7/2020 | Ferber ................ A61B 5/02427 |
| 2020/0249154 | A1* | 8/2020 | Satpathy ............. G01N 33/4925 |
| 2021/0052164 | A1* | 2/2021 | Shnaiderman ..... A61B 5/14546 |
| 2021/0100484 | A1 | 4/2021 | Basiri |
| 2022/0012459 | A1* | 1/2022 | Schwiegerling ..... A61B 3/0025 |
| 2022/0142484 | A1* | 5/2022 | DiMaio ................. G16H 50/20 |
| 2022/0378333 | A1 | 12/2022 | Basiri |

FOREIGN PATENT DOCUMENTS

| | | |
|---|---|---|
| WO | WO-2014151114 A1 | 9/2014 |
| WO | WO-2015105689 A1 | 7/2015 |
| WO | WO-2017083513 A1 | 5/2017 |
| WO | WO-2017100685 A1 | 6/2017 |

OTHER PUBLICATIONS

International Search Report and Written Opinion issued in International Application No. PCT/US2021/065563 on Apr. 8, 2022.
PCT/US2016/065990 International Search Report and Written Opinion dated Mar. 15, 2017.

* cited by examiner

METHODS AND DEVICES FOR MEASURING STRUCTURAL AND FUNCTIONAL PROPERTIES OF TISSUE

STATEMENT AS TO FEDERALLY SPONSORED RESEARCH

This invention was made with the support of the United States government under Small Business Innovation Research Grant Nos. 1647279 and 1853245 awarded by the National Science Foundation.

BACKGROUND

Tissue oxygenation is an important physiological parameter in at least some instances. Abnormal oxygenation of tissues and blood is implicated in a number of diseases preceding tissue damage, including infectious processes, diabetic retinopathy, choroidal disorders, stroke and cancer. For instance, the retinal vasculature's oxygen saturation ($SO_2$) is a valuable indicator of disease, in particular for patients with diabetic retinopathy (DR) who may experience changes in retinal oxygen saturation during their lifetime. A broad range of studies have shown that the earliest detectable sign of DR is an increase of ~4% in the $SO_2$ in the retinal veins. Once DR is detected, there are treatment options available to slow or stop DR progression and prevent retinal structural damage. The Early Treatment Diabetic Retinopathy Study (ETDRS), a multicenter clinical trial funded by the NEI, aims to determine whether the progress of DR could be slowed or stopped using either argon laser photocoagulation or aspirin treatment. Although a number of experimental systems aimed at measuring retinal $SO_2$ have been developed, a reliable, robust model for in vivo monitoring is still lacking.

Prior methods and apparatus of measuring oxygenation of the tissue can be less than ideal. The prior methods and apparatus can be more complex and less accurate than would be ideal, and may not be well suited for tissue oxygenation mapping. For example, tissue can move and degrade measurements and the prior methods and apparatus can be less than ideally suited to measure tissue quickly. Measurements of retinal tissue of the eye can be subject to movement when the eye moves, and ocular measurements of the retina can be more difficult and less accurate than would be ideal. Additionally, the retina can be layered and highly absorbing, which can increase the difficulty of measuring retinal tissue.

SUMMARY

The methods and apparatus disclosed herein provide improved measurements of tissue oxygenation with decreased measurement times and improved measurement accuracy. The methods and apparatus disclosed herein are capable of measuring oxygenation of the tissue with a reduced number of image frames captured by a detector comprising a plurality of pixels, which substantially prevents a degrading in measurement caused by a movement of the tissue during the measurement and improves the accuracy. In some embodiments, single snapshot of the tissue can be used to determine and map blood oxygenation. The methods and apparatus disclosed herein are particularly advantageous in measuring oxygenation of tissue such as retinal tissue of the eye.

A light pattern can be projected onto the tissue, and a reflected light pattern can be imaged by a detector (e.g., a CCD). The light pattern imaged by the detector can be transformed with a transform function to generate a transform data, and the transform data can be used to determine the oxygenation of the tissue. A map of tissue oxygenation can be determined in response to the transform data from a single measurement frame (e.g., a single snapshot of the tissue) from the detector and displayed to a user.

Rather than a light pattern having a plurality of superimposed patterns, the methods and systems disclosed herein may use a "free phase" in which a single pattern may be used while explicitly accounting for phase. Further, the methods and systems disclosed herein may use multiple distinct wavelengths to provide an internal standard for measuring terms related to retinal absorption (e.g., related to blood oxygenation). The methods and systems disclosed herein may provide an accurate physics-based model of tissue oxygenation across a heterogeneous tissue surface. Saccadic eye movement may be accounted for with single shot oxygenation images or with eye tracking. In some cases, position changes in the eye may be used to explicitly account for phase differences between images. This method may turn what was a detriment to other techniques into an opportunity. Further, methods and systems disclosed herein may not use an external reference (such as a look-up table) to relate the data to retinal absorption and thus retinal blood oxygenation.

In an aspect, the present disclosure provides a method of determining a parameter related to a blood oxygenation of tissue, the method comprising: (a) projecting an optical pattern onto the tissue, the optical pattern comprising a spatially varying component in at least one axis; (b) collecting a reflected optical signal from at least a first and a second wavelength range, wherein the first and the second wavelength ranges are distinct; (c) normalizing the reflected optical signal; (d) performing a transform of the reflected optical signal; and (e) determining the parameter related to the blood oxygenation of the tissue based on the ratio and the transform.

In some embodiments, the method further comprises extracting a non-spatially varying component and at least one spatially varying component of the transformed data. In some embodiments, (e) comprises determining the parameter based on the non-spatially varying component and the at least one spatially varying component of the transformed data. In some embodiments, the normalizing is self-normalizing. In some embodiments, the method comprises determining a statistical significance of each of the at least two parameters related to the blood oxygenation of the tissue. In some embodiments, the method comprises providing the parameter to a clinician. In some embodiments, the method comprises providing the parameter and secondary health data to a clinician. In some embodiments, the method comprises incorporating the parameter and secondary health data into a disease model. In some embodiments, the secondary health data comprises one or more of diet, family history, age, gender, and medical history. In some embodiments, the method comprises identifying healthy tissue, an onset or a progression of a disorder related to retinal oxygenation, or an indeterminate tissue disease state. In some embodiments, the disorder comprises one or more of glaucoma, diabetic retinopathy, age-related macular degeneration, retinal vein occlusion, Alzheimer's disease, choroidal disorders, stroke, or cancer. In some embodiments, (c) occurs before (d). In some embodiments, (d) occurs before (c). In some embodiments, (d) comprises extracting at least two spatially varying frequency components from the transform. In some embodiments, the method comprises forming a 2D map of the parameter. In some embodiments, the first wavelength range is more sensitive to an absorption of hemoglobin than an absorption of deoxyhemoglobin and wherein the second wavelength ranges is about equally sensitive to the absorption of hemoglobin than the absorption of deoxyhemoglobin. In some embodiments, the first wavelength range is at least about 5%, about 10%, or about 20% more sensitive to the absorption of hemoglobin than the absorption of deoxyhemoglobin than the second wavelength range. In some embodiments, the normalizing comprises using the first and the second wavelength range, single pixel normalization, or two location-based normalization. In some embodiments, the transform is a Fourier transform. In some embodiments, the first wavelength and the second wavelength are the same wavelength.

In another aspect, the present disclosure provides a device for measuring a parameter related to a blood oxygenation of tissue, the device comprising: an optical source comprising at least a first and a second wavelength range, wherein the optical source is configured to project an optical pattern, the optical pattern comprising a spatially varying component in at least one axis; a detector for collecting a reflected optical signal from the first and the second wavelength range, wherein the first and the second wavelength ranges are distinct; a processor operatively coupled to the detector, the detector comprising a non-transitory computer readable storage medium comprising instruction, the instructions configured to: normalizing the reflected optical signal using the first and the second wavelength range: performing a transform of the reflected optical signal; and determining the parameter related to the blood oxygenation of the tissue based on the ratio and the transform.

In some embodiments, the detector comprises at least a first detector subunit and a second detector subunit, wherein the first detector receives the first wavelength range and the second detector subunit receives the second wavelength range. In some embodiments, the device comprises a diffuser, wherein the diffuser is configured to produce the pattern. In some embodiments, the pattern comprises a 1D sinusoid. In some embodiments, the device comprises a cross polarizer configured to accept diffusely reflected light.

In another aspect, the present disclosure provides a method of determining a functional parameter or structural parameter of tissue, the method comprising: (a) projecting an optical pattern onto the tissue, the optical pattern comprising a spatially varying component in at least one axis; (b) collecting a reflected optical signal from at least a first and a second wavelength range, wherein the first and the second wavelength ranges are distinct; (c) normalizing the reflected optical signal; (d) analyzing a real space image generated by the optical signal; and (e) determining the functional parameter or structural parameter of the tissue based analysis of the real space image.

In some embodiments, the normalizing is self-normalizing. In some embodiments, the method comprises identifying healthy tissue, an onset or a progression of a disorder related to retinal oxygenation, or an indeterminate tissue disease state. In some embodiments, the disorder comprises one or more of glaucoma, diabetic retinopathy, age-related macular degeneration, retinal vein occlusion. Alzheimer's disease, choroidal disorders, stroke, or cancer. In some embodiments, (c) occurs before (d). In some embodiments, (d) occurs before (c). In some embodiments, the normalizing comprises using the first and the second wavelength range, single pixel normalization, or two location-based normalization. In some embodiments, the first wavelength and the second wavelength are the same wavelength. In some embodiments, the functional parameter comprises a blood oxygenation analogue. In some embodiments, the structural parameter comprises a degree of blurriness. In some embodiments, the analysis of the real space image comprises analysis of a single image. In some embodiments, the analysis of the real space image comprises analysis of a plurality of real space images. In some embodiments, the analyzing the real space image comprises analyzing a single location in the plurality of real space images. In some embodiments, the plurality of real space images are generated during a movement of the tissue. In some embodiments, the movement of the tissue is a saccadic eye movement.

In another aspect, the present disclosure provides a method of determining a parameter related to a functional or structural property of a tissue. The method may comprise: (a) receiving from a detector a reflected optical signal from at least a first and a second wavelength range, wherein the first wavelength range and the second wavelength range are distinct and wherein the reflected optical signal comprises a spatially varying component in at least one axis; (b) normalizing the reflected optical signal to form normalized data; (c) performing a transform of the reflected optical signal to form transformed data; (d) forming a ratio comprising an oscillating portion and a non-oscillating portion of the transformed data; and (e) determining the parameter based on the ratio and the normalized data, wherein the parameter comprises an analog of blood oxygenation saturation or a structural parameter of the tissue.

In some embodiments, the method further comprises forming at least two parameters related to the blood oxygenation saturation of the tissue, wherein each of the parameters relates to different locations within the tissue, different collection intervals, or different normalization types. In some embodiments, the method further comprises determining a statistical significance of each of the at least two parameters related to the blood oxygenation saturation analogue of the tissue. In some embodiments, the method further comprises providing the parameter to a clinician. In some embodiments, the method further comprises providing the parameter and secondary health data to the clinician, wherein the secondary health data comprises one or more of diet, family history, age, gender, and medical history. In some embodiments, the method further comprises incorporating the parameter and secondary health data into a disease model. In some embodiments, the secondary health data comprises one or more of diet, family history, age, gender, and medical history.

In some embodiments, the method further comprises identifying a healthy tissue, an onset or a progression of a disorder related to retinal oxygenation, or an indeterminate tissue disease state based on the parameter. In some embodiments, the disorder comprises one or more of glaucoma, diabetic retinopathy, age-related macular degeneration, retinal vein occlusion. Alzheimer's disease, choroidal disorders, stroke, or cancer. In some embodiments, (b) occurs before (c). In some embodiments, (c) occurs before (b). In some embodiments, (c) comprises extracting at least two spatially varying frequency components from the transform.

In some embodiments, the method further comprises forming a 2D map of the parameter. In some embodiments, the first wavelength range is more sensitive to an absorption of hemoglobin than an absorption of deoxyhemoglobin and wherein the second wavelength range is about equally sensitive to the absorption of hemoglobin as the absorption of deoxyhemoglobin. In some embodiments, the first wavelength range is at least about 5%, about 10%, or about 20% more sensitive than the second wavelength range to the absorption of hemoglobin. In some embodiments, the normalizing comprises: normalization based on the first wavelength range and the second wavelength range, single pixel normalization, or two location-based normalization. In some embodiments, the transform is a Fourier transform, a spatial transform, or a time-domain transform. In some embodiments, the parameter related to structural property is a parameter related to the degree of blurriness of the tissue.

In another aspect, the present disclosure provides a device for measuring a parameter related to a structural or functional property of a tissue. The device may comprise: an optical source comprising at least a first wavelength range and a second wavelength range, wherein the optical source is configured to project an optical pattern, the optical pattern comprising a spatially varying component in at least one axis; a detector for collecting a reflected optical signal from the first wavelength range and the second wavelength range, wherein the first and the second wavelength ranges are distinct; a processor operatively coupled to the detector, the detector comprising a non-transitory computer readable storage medium comprising instructions, the instructions configured to: normalize the reflected optical signal to form normalized data; perform a transform of the reflected optical signal to form transformed data; and determine the parameter related to the blood oxygenation saturation analogue or structural parameter image of the tissue based on the normalized data and the transformed data.

In another aspect, the present disclosure provides a method of determining a functional parameter or structural parameter of tissue. The method may comprise: (a) projecting an optical pattern onto the tissue, the optical pattern comprising a spatially varying component in at least one axis; (b) collecting a reflected optical signal from at least a first and a second wavelength range, wherein the first and the second wavelength ranges are distinct; (c) normalizing the reflected optical signal; (d) analyzing a real space image generated by the optical signal; and (e) determining the functional parameter or structural parameter of the tissue based analysis of the real space image.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the present disclosure are set forth with particularity in the appended claims. A better understanding of the features and advantages of the present disclosure will be obtained by reference to the following detailed description that sets forth illustrative examples, in which the principles of the present disclosure are utilized, and the accompanying drawings or figures (also "FIG." and "FIGS." herein), of which:

DETAILED DESCRIPTION

Biological tissues are composed of a variety of chromophores, which are molecules that absorb light of characteristic wavelengths. If the amount of light that a tissue absorbs can be measured, then concentrations of the chromophores in the tissue can be calculated. This can be useful in clinical applications because some of chromophores in body tissue are markers of important clinical parameters, such as oxygenation. The attenuation of light in tissue is a function of both its absorption and scattering properties. Spatial frequency domain imaging (SFDI) can be used to separate the effects of scattering and absorption, and consequently, to quantify a set of chromophores. SFDI works by shining a pattern of light on the tissue, capturing images of the reflected light, and processing the captured images. The processing the captured images may comprise, at least in part using, a Fourier transform. In this disclosure. SFDI is used in calculating tissue oxygenation.

The Fourier transform of the reflected image carries with it an associated phase. To account for phase differences between images at differing conditions, some SFDI approaches use a sinusoidal light pattern at different phases (0, 2π/3, 4π/3) projected on the sample, and three sample images are acquired. A reference with known optical properties is used to extract the AC/DC components of the reflectance. From these components, a steady-state diffusion equation can calculate the absorption and reduced scattering. Requiring three snapshots is problematic if the tissue has motion artifacts, such as with retinal imaging. In other approaches, multiple patterns with different spatial frequencies or alignments of spatial frequency components.

The present disclosure provides an improved optical method and apparatus for non-invasive measurement of tissue oxygenation. Though generally described herein with respect to determining tissue oxygenation of an eye, the methods and systems may be used for determining tissue oxygenation of an arbitrary tissue. For example, the oxygenation of muscle tissue may be determined similarly to that of an eye. In another example, lung tissue may be analyzed in a similar way to an eye.

Figure 1:
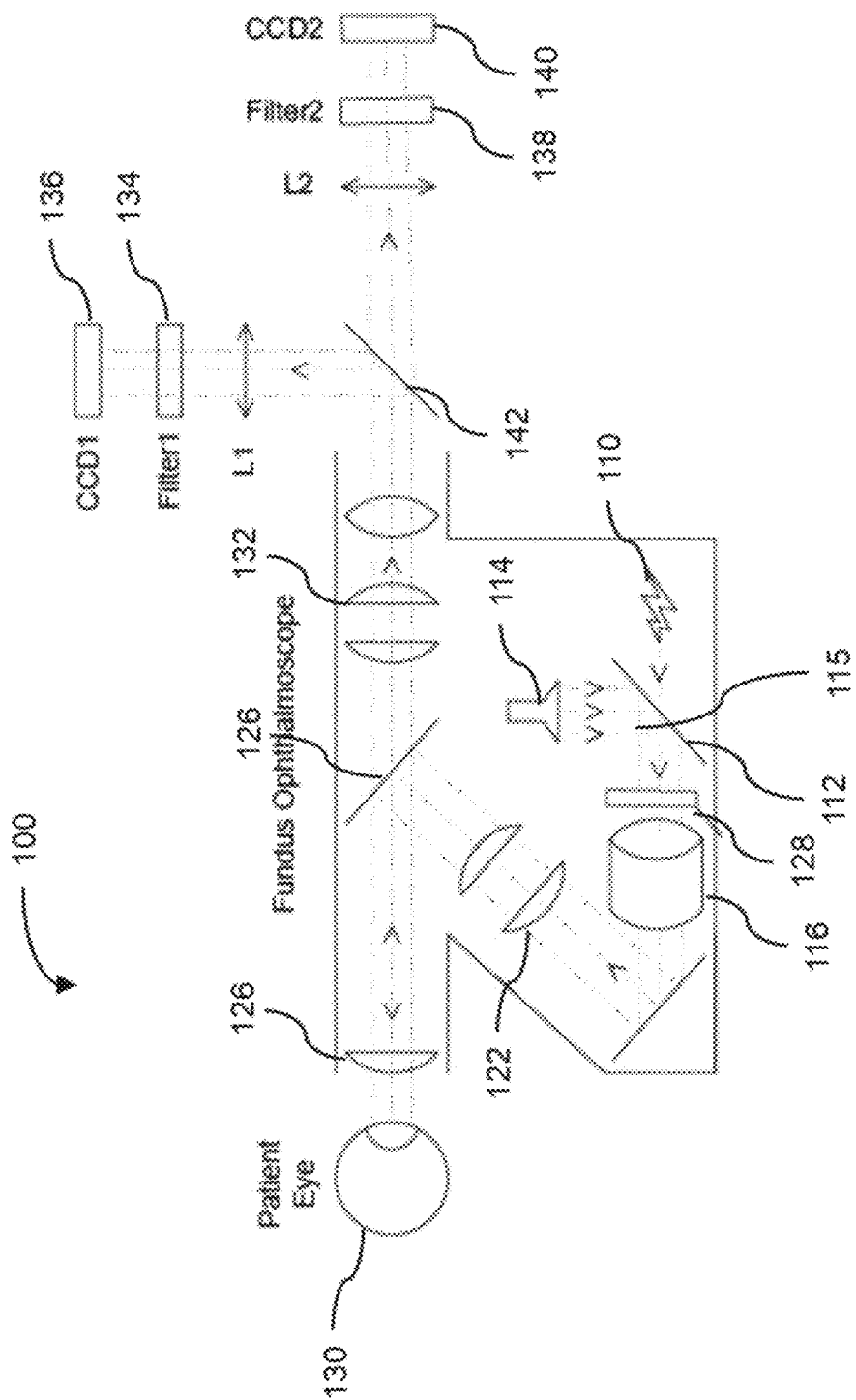
FIG. 1 illustrates a system for measuring an oxygenation analogue or structural parameter of retinal vasculature, in accordance with embodiments.

FIG. 1 illustrates a device 100 for measuring oxygenation of tissue. In some embodiments, the tissue can be retinal vasculature of an eye. A main light source 110 can be provided to illuminate a patient's tissue. The main light source can be an optical source emitting visible light and/or infrared light. The use of infrared light may improve performance of the device. For example, infrared light may not require use of dilation due to the eye being unresponsive to infrared wavelengths, improving speed and non-invasiveness. Another example of an improvement provided by infrared light may be a greater penetration of the light into the blood vessels and tissues, improving signal derived from the interaction of the light with the blood and tissues. In some instances, light source 110 may be a broadband light source. In some instance, light source 110 may be a hot filament lamp, e.g., a tungsten lamp. In some instances, the main light source can be a laser source, such as a laser diode. In some embodiments, the main light source can be an infrared laser diode such as a near-infrared (NIR) diode. Alternatively, the main light source can be a LED. The main light source may be an LED array. The LED array may comprise a plurality of colors of LEDs and/or a plurality of the same color of LED. The LED array may comprise a medium which creates a broad band spectrum from a plurality of colors of LED. For example, the LED array may comprise a fluorophore.

In some embodiments, a secondary illumination source 114 can be provided in addition to the main light source. The light beam from the secondary illumination source can be mixed with the light beam from the main light source. In some instances, a reflecting surface 112 can be provided to mix the light beam from the main light source and the light beam from the secondary illumination source. For instance, the reflecting surface can be a beam splitter, such as a polarizing beam splitter, a reflective beam splitter, a patterned beam splitter, etc., to allow the light beam mixture. The secondary illumination source can provide additional lighting as can be needed to more completely illuminate the tissue. The resulting beam 115 from the reflecting surface can comprise a plurality of light wavelengths. The light wavelengths can be chosen to be distributed about an isosbestic point of oxygenated blood. In some embodiments, the light beam can comprise two wavelengths of light. For example, secondary illumination source 114 may comprise a second broad band source to expand a bandwidth of the illumination. For example, the resulting beam can comprise wavelengths of about 560 nm and about 655 nm. For example, the resulting beam can comprise, at least, wavelengths of 780 nm and 710 nm. Alternatively, the light beam can comprise more than two wavelengths of light. The term "about" when used in reference to the wavelength of light, in some embodiments means within 30%, 25%, 20%, 15%, 10%, 9%, 8%, 7%, 6%, 5%, 4%, 3%, 2%, 1%, 0.5%, 0.1%, or 0.05% of a given value or range. In some examples, the term "about" means within 50 nm, 30 nm, 20 nm, 10 nm, 5 nm, or 1 nm of a given value or range.

In some embodiments, the main light source can comprise an array of light emitting diodes, arranged to generate a sinusoidal pattern of light. In some instances, the main light source can generate a light beam comprising a plurality of sinusoidal spatial modulations. In some embodiments, the main light source can comprise a first array of LEDs with a first spatial modulation frequency and a first polarization, and the secondary illumination source can comprise a second array of LEDs with a second spatial modulation frequency and a second polarization. The light beam may be unpolarized. The light beam from the main light source and the light beam from the secondary illumination source can be combined by the reflecting surface (for example, a polarizing beam splitter, a reflective beam splitter, a dichroic beam splitter, etc.). The light beam from the main light source and the light beam from the secondary illumination source can be combined while maintaining their separate polarizations for use in ellipsometry. The light beams may not be configured for use in ellipsometry. In some cases, the main light source and secondary light source comprise substantially the same polarization.

A diffuser 128 can be positioned in the path of the resulting beam from the reflecting surface, to eliminate high-order components. The diffuser can also generate a smooth sinusoidal pattern of light. The smooth sinusoidal pattern can be generated for each wavelength of light in the resulting beam. The diffuser may comprise transparency paper. The diffuser may comprise transparency paper with a pattern. The diffuser comprising the transparency paper may comprise a spatial sinusoidal pattern. The sinusoidal pattern may be a 1D sinusoidal pattern, a 2D sinusoidal pattern, a 3D sinusoidal pattern, or the like.

The light beam can then be directed through shaping optics 116, which are configured to shape an incident, which is in a substantially Gaussian beam profile, into a toroidal beam profile. In some examples, shaping optics 116 comprise diffractive optical elements (DOE) that convert an input beam from a Gaussian profile to a donut-shaped ring. Shaping optics may comprise diffractive phase plates. Thereafter, the light beam can be directed into focusing optics 122.

In some embodiments, the light beam can then be sent through focusing optics 122, as needed, to shape the light beam to have an appropriately-sized toroidal beam profile. Focusing optics 122 may comprise a telescope. Focusing optics 122 may comprise a pair of lenses, a pair curved mirrors, a lens and a curved mirror, etc. Focusing optics 122 may comprise a commercial objective lens array, a relay lens array, etc. The light beam can be reflected off a beam splitter 124, which comprises a reflective surface with a hole through which light can pass. The toroidal beam profile can be aligned such that its center coincides with the hole, such that most of the incident light of the beam is reflected toward a target tissue 130. The target tissue can be retina, which is a non-diffuse multi-layered tissue.

The light reflected toward the target tissue can be focused by a focusing lens 126 to fall on the target tissue. The focusing lens 126 may or may not comprise a condensing lens. In some instance, the target tissue can be retina, the incident light can be focused by the focusing lens to fall on the retina, strike the patient's retina and scatter off. A significant portion of the scattered light can be reflected back toward the beam splitter 124 and can be directed through the hole in the beam splitter 124. The scattering may be diffuse scattering. The light may be selected such that it has an increased scattering interaction with the retina of the patient, and thus generate increased diffuse reflectance. For example, the light can be of a wavelength where blood and the retina are more scattering.

Shaping optics 132 can then be provided in the light path to resize the light beam before the light path is directed to one or more detectors. Shaping optics 132 may comprise a telescope. Shaping optics 132 may comprise a lens to focus the light path onto the one or more detectors. Shaping optics 132 may comprise a pair of lenses, a pair curved mirrors, a lens and a curved mirror, etc. Shaping optics 132 may comprise a commercial objective lens array, a relay lens array, etc.

The light beam may be directed through a second beam splitter 142. The second beam splitter may split the beam into two or more light paths. The two or more light paths may comprise different wavelength ranges, different polarization ranges, different intensities, etc. In some cases, each of the two or more light paths may be directed to a detector. In some cases, multiple light paths may be directed to the same detectors. The light may be directed through a single beam splitter comprising a plurality of channels rather than a second beam splitter. For example, the light can be directed through a beam splitter with two, three, four, or more channels.

The light beam can be directed through one or more filters to isolate the wavelengths of light to be collected by the one or more detectors. Device 100 shows filters 134 and 138, each of which are on the light paths in front of detectors 136 and 140, respectively. The one or more filters can comprise an image splitter. For example, the filter can direct light of different wavelengths to different portions of a detector. In some cases, each filter comprises a wavelength dependent filter, which may allow a wavelength of interest to be passed to a detector. For example, a wavelength of about 560 nm may be selectively directed to a first detector and a wavelength of about 655 nm may be selectively directed to a second detector. Each detector may comprise one or more lenses, for example, to focus on each of the one or more detector surfaces, e.g. L1 and L2.

Device 100 may comprise one or more detectors, e.g., a detector 136 and a detector 140. The one or more detectors can be of various types. In some cases, a detector comprises a CCD camera comprising an array of pixels. Each portion of the detector can measure an image of the corresponding wavelength. The light beam can strike the detector, allowing the light beam to be imaged.

Device 100 may collect two types of images simultaneously or nearly simultaneously, one from each of at least two detectors. In some cases, the first detector may collect an image at about 560 nm and the second detector may collect an image at about 655 nm. These wavelengths correspond to relevant positions in the absorption spectrum of hemoglobin. Hemoglobin and deoxyhemoglobin may comprise nearly the same optical absorption in the range of 560 nm. At 655 nm, the extinction coefficient of deoxyhemoglobin may be nearly an order of magnitude higher than oxygenated hemoglobin.

From these two types of images a third image can be created which corresponds to the ratio of the absorption at about 655 nm to the absorption at about 560 nm. This ratio relates to the absolute oxygen concentration in the tissue.

The detector can be coupled to a processor, not shown, which can be used to determine blood oxygenation based on measured signals from detector. The processor can further be coupled to a display to show measured results, such as a blood oxygenation map, to the user.

The device 100 may comprise a cross polarizer. The cross polarizer may be positioned to provide effects as described elsewhere herein (e.g., selecting for diffusely reflected light). A portion of the cross polarizer may be placed subsequent to the light source 110. An additional portion of the cross polarizer may be placed prior to the element 142 to select the polarization of the light reflected from the eye.

Figure 2:
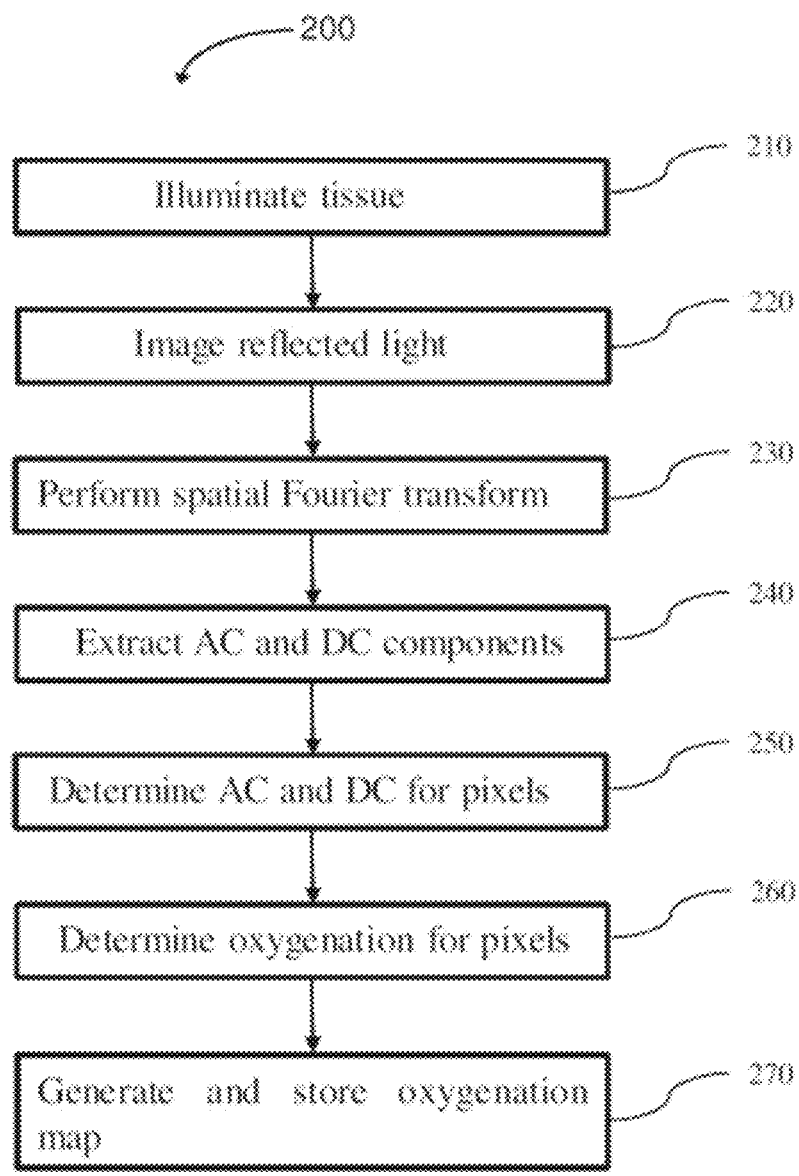
FIG. 2 illustrates a flowchart of a method of measuring blood oxygenation saturation analogues in a retina, in accordance with embodiments.

Image Analysis:

FIG. 2 illustrates a method 200 of measuring a blood oxygenation analogue in a tissue. In process or step 210, a tissue such as retina of the patient can be illuminated with illuminating light. The illuminating light can come from a main light source. The main light source can be an optical source emitting visible light and/or infrared light. In some instances, the main light source can be a laser source, such as an infrared laser diode. In some embodiments, the main light source can comprise an array of light emitting diodes, arranged to generate a sinusoidal pattern of light. The illuminating light can comprise a plurality of wavelengths. In some embodiments, the illuminating light can comprise two wavelengths of light. Alternatively, the illuminating light can comprise more than two wavelengths of light. The illuminating light can comprise a sinusoidal intensity distribution: for example, a 1D sinusoid or a 2D sinusoid. In some cases, the illuminating light can comprise a plurality of summed sinusoids, including sinusoids summed with different weighting factors. The illumination can comprise a single imaging pulse, with a single sinusoidal intensity distribution. In some embodiments, the imaging pulse can comprise a plurality of frequencies and a plurality of sinusoidal spatial modulations. Each spatial modulation may correspond to a particular polarization.

The illuminating light can be allowed to reflect from the tissue for collection in an apparatus configured to measure light intensity. In some instances, the apparatus can be configured to determine light intensity as a function of polarization. For example, the light intensity can be determined as a function of polarization by using an ellipsometer. The polarization of the illuminating light can be used to select for diffuse reflectance. For example, a polarized light source can be directed to shine on a patient's eye, the light can interact with the eye and be directed towards a detector, and a second polarizer can be placed in front of the detector at a cross polarization to the polarized light source. In this example, only light that interacted with the tissue and thus received a change in polarization can be detected by the detector, as non-interacting light may still be at cross polarization and thus be rejected.

In process or step 220, the reflected light from the tissue can be imaged by a detector. The detector can be an array of pixels, for example pixels of a CCD array. Each of a plurality of wavelengths can be measured on corresponding pixels of the detector. For example, different wavelengths can be separated by filter to illuminate corresponding portions of the CCD.

In process or step 230, a spatial Fourier transform can be performed. Optionally, a spatial Fourier transform may not be performed. In some cases where a spatial Fourier transform is not performed, the AC and DC components may be extracted from a real space image. Based on this spatial Fourier transform, in process or step 240, a plurality of frequency components can be extracted, corresponding to AC and DC components. The AC and DC components can correspond to sinusoidal components. In some instances, the DC component is the sinusoidal component where frequency is 0, and an AC component may be the sinusoidal component where frequency is an imposed spatial frequency, f, with corresponding wavenumber, k. The intensities of each of the DC and AC components can be determined, and a frequency-specific intensity can be determined for each. For example, a general form of AC and DC components truncated after the first Fourier component can correspond to the intensity equation $I=A+B\cos(kx+\varphi)$, in which A is the DC component and B is the AC component for the first oscillatory component.

AC and DC are both modified by their interaction with the retina and blood vessels and carry information about the tissue. For at least the first order Fourier component, the spatial frequency number k may be assumed to be the same in the incident and reflected light. The spatial frequency may be imparted by the diffuser. In a 1D intensity distribution, the modulation may be on 1 axis, e.g. the Y-axis, and in the other axis, e.g., the X-axis, there may be no change. Therefore, within an image, the phase $\varphi$ may be the same for all points with the same value on the non-modulated axis. With known k and phase, the AC and DC components can be fit for every pixel. Between images taken at different times, saccadic movement of the eye may impart differences in phase as a point of interest moves between frames.

In an optional process or step 250, AC and DC components can be determined for a plurality of pixels of the detector (for example, the CCD). Specific Fourier components corresponding to each of the AC and DC intensities can be isolated with only a modest decrease in spatial resolution. For example, AC and DC intensities can be determined with a resolution loss factor of 10 to 1. Thus, for example, a 1000×1000 detector can produce an image for each component with an effective resolution of about 100× 100.

In process or step 260, blood oxygenation saturation analogue levels can be determined for a plurality of pixels. The blood oxygenation saturation analogue level of each pixel of the plurality of pixels can be determined by a comparison of the intensities of the AC and DC components of reflected light for the plurality of wavelengths, from which absorption or an absorption analogue can be determined. Known absorption properties of tissue, and especially of oxygenated and deoxygenated blood, can be used to calculate an absorption analogue based on the relative intensities of the AC and DC components, e.g. the ratio AC/DC. The retina may be significantly absorbing, resulting in a decrease in light reflected back the detector. Absorption by the retina also results in a decrease in an amount of light reflected to the detector. The ratio AC/DC may relate to how much light was reflected versus scattered. The light which is absorbed can show a modulation with the spatial frequency. The light which is scattered may not depend or merely depends less on the spatial frequency. By using an oxygen saturation analogue, errors associated with models for determining optical properties and/or errors associated with models for calculating oxygen saturation can be removed, resulting in improved performance and data quality. As used herein, alpha may be related to oxygen saturation, but is not necessarily oxygen saturation.

The ratio AC/DC can be represented, for example, as a map of blood oxygenation saturation analogue. Measurement sensitivity of 3.5% or better can be achieved. For example, a measurement sensitivity of at least about 2.5% can be achieved. Thus, it can be possible to diagnose small changes in blood oxygenation, where increased oxygenation of about 3% to 5% can be a warning sign of diseases such as diabetic retinopathy. Because this determination can be made from a single image, noise sources such as tissue movement between images can be avoided.

In process or step 270, a blood oxygenation saturation analogue map can be generated and stored to a computer-readable medium. The blood oxygenation saturation analogue map can be further displayed to a user. If the blood oxygenation saturation analogue map indicates an increased oxygenation above a threshold, a warning can be provided, indicating that the user can be in danger of diseases such as diabetic retinopathy. The threshold can be a predefined threshold or can be based on a comparison to prior measurements of the blood oxygenation saturation analogue.

Although the above processes and steps show a method of measuring a tissue oxygenation analogue in accordance with some embodiments, a person of ordinary skill in the art will recognize many variations based on the teachings described herein. The processes and steps can be completed in a different order. Processes and steps can be added or deleted. Some of the processes and steps can comprise sub-processes and sub-steps of other processes and steps. Many of the processes and steps can be repeated as often as desired by the user.

Figure 3B:
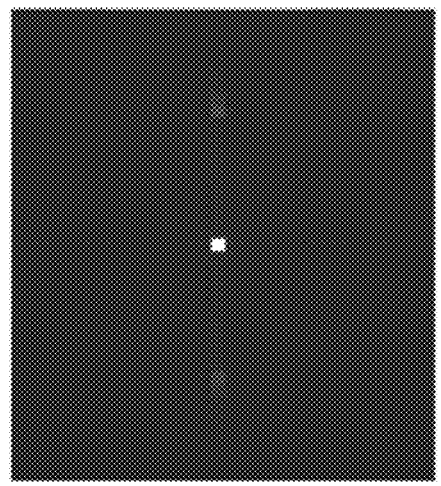
FIG. 3B illustrates a Fourier transform of a sinusoidal pattern, in which AC and DC components correspond to different Fourier peaks, in accordance with embodiments.
Figure 3A:
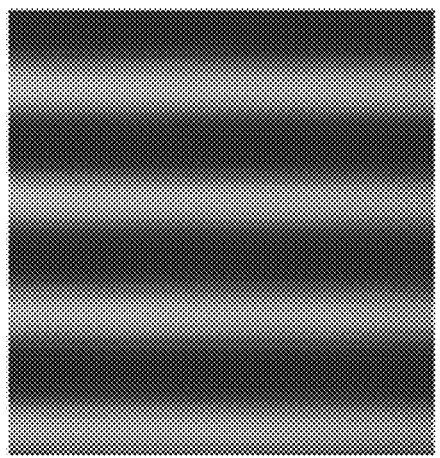
FIG. 3A illustrates a sinusoidal pattern, which can be applied to light emitted from LEDs to impart a spatial frequency in a light beam, in accordance with embodiments.

FIG. 3A illustrates a sinusoidal pattern, which can be applied to light emitted from the main light source to impart a spatial frequency in a light beam, as disclosed herein. FIG. 3B illustrates a Fourier transform of a sinusoidal pattern, in which AC and DC components correspond to different Fourier peaks. The central peak corresponds to the DC component, and the side peaks correspond to AC components. Each component can individually be extracted to generate a corresponding two-dimensional intensity distribution. For example, unwanted peaks can be masked off and an inverse Fourier transform can be applied to generate a two-dimensional image corresponding only to unmasked spatial frequencies.

Figure 4:
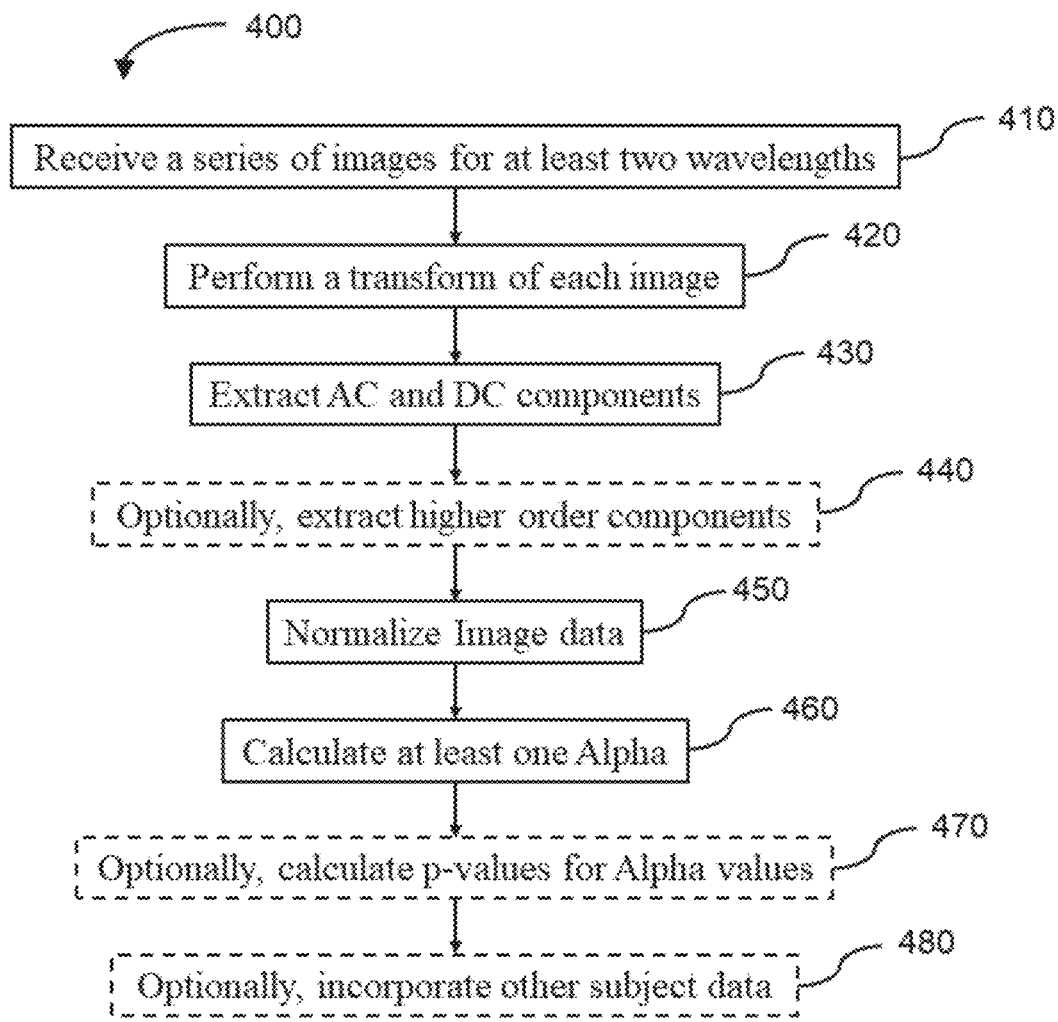
FIG. 4 is a flowchart of a method for analyzing an image comprising a pattern, in accordance with embodiments.

FIG. 4 is a flowchart of a method 400 for analyzing an image comprising a pattern, in accordance with embodiments. At an operation 410, a series of images may be received. The images may be received from a device or system of the present disclosure. The images may be received from an embodiment, variation, or example of device 100 described herein, for example, with respect to FIG. 1. Device 100 may collect two types of images simultaneously or nearly simultaneously, one from each of at least two detectors. In some cases, the first detector may collect an image at about 560 nm and the second detector may collect an image at about 655 nm. These wavelengths correspond to relevant positions in the absorption spectrum of hemoglobin. Hemoglobin and deoxyhemoglobin may comprise nearly the same optical absorption in the range of 560 nm. At 655 nm, the extinction coefficient of deoxyhemoglobin is nearly an order of magnitude higher than oxygenated hemoglobin. From these two types of images a third image can be created which corresponds to the ratio of the absorption at about 655 nm to the absorption at about 560 nm. This ratio relates to the absolute oxygen concentration in the tissue.

At an operation 420, the image, or a portion thereof, may be transformed into the spatial frequency domain using a Fourier transform. At an operation 430, AC and DC components may be extracted. Based on this spatial Fourier transform, a plurality of frequency components can be extracted, corresponding to AC and DC components. The AC and DC components can correspond to sinusoidal components. In some instances, the DC component is the sinusoidal component where frequency is 0), and a AC component may be the sinusoidal component where frequency is an imposed spatial frequency, f, with corresponding wavenumber, k. The intensities of each of the DC and AC components can be determined, and a frequency-specific intensity can be determined for each. For example, a general form of AC and DC components truncated after the first Fourier component can correspond to the intensity equation I=A+Bcos(kx+φ), in which A is the DC component and B is the AC component for the first oscillatory component.

AC and DC are both modified by their interaction with the retina and blood vessels and carry information about the tissue. For at least the first order Fourier component, the spatial frequency number k may be assumed to be the same in the incident and reflected light. The spatial frequency may be imparted by the diffuser. In a 1D intensity distribution, the modulation may be on 1 axis, e.g. the Y-axis, and in the other axis, e.g., the X-axis, there may be no change. Therefore, within an image, the phase φ may be the same for all points with the same value on the non-modulated axis. With known k and phase, the AC and DC components can be fit for every pixel.

Figure 5:
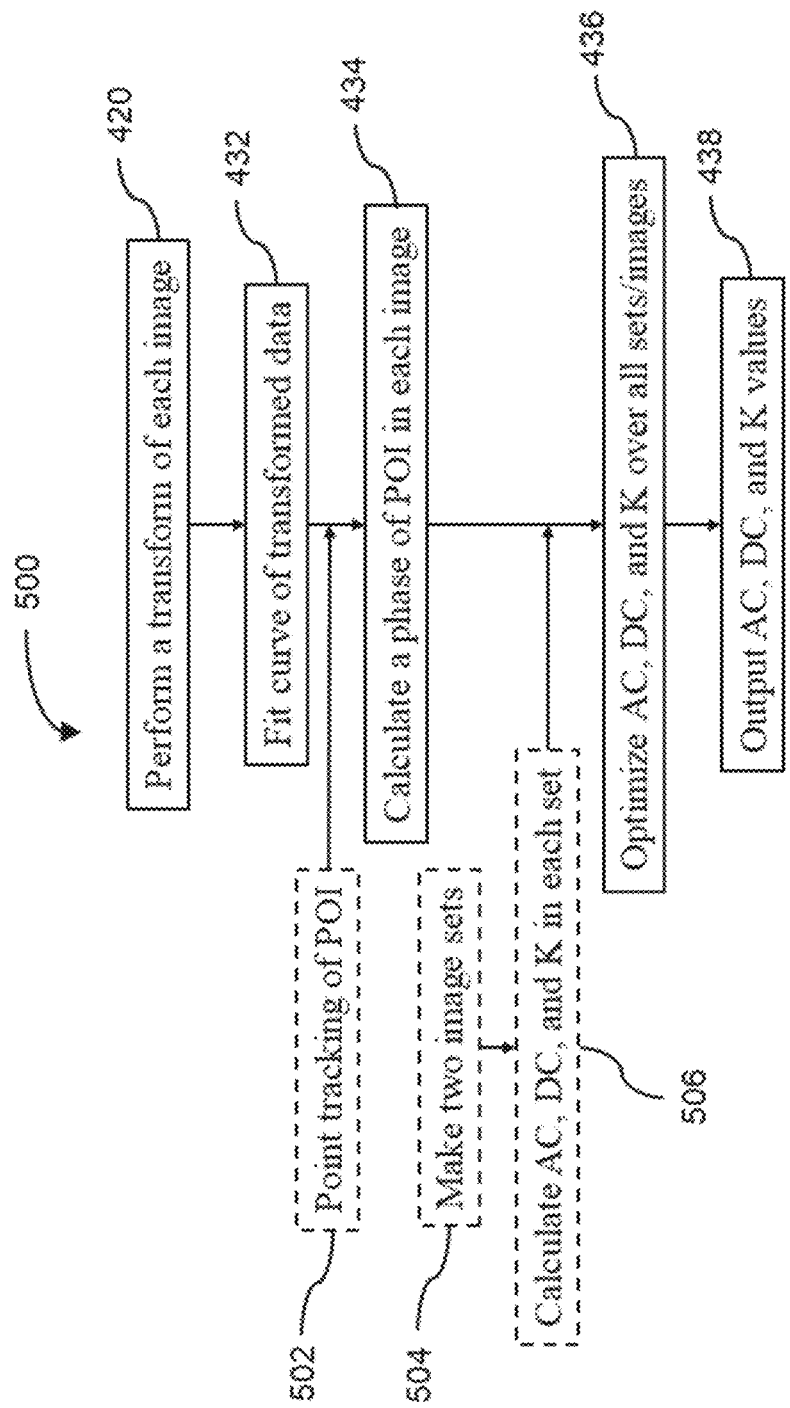
FIG. 5 is a flowchart of a method of extracting AC, DC, and AC/DC components, in accordance with embodiments.
Figure 6:
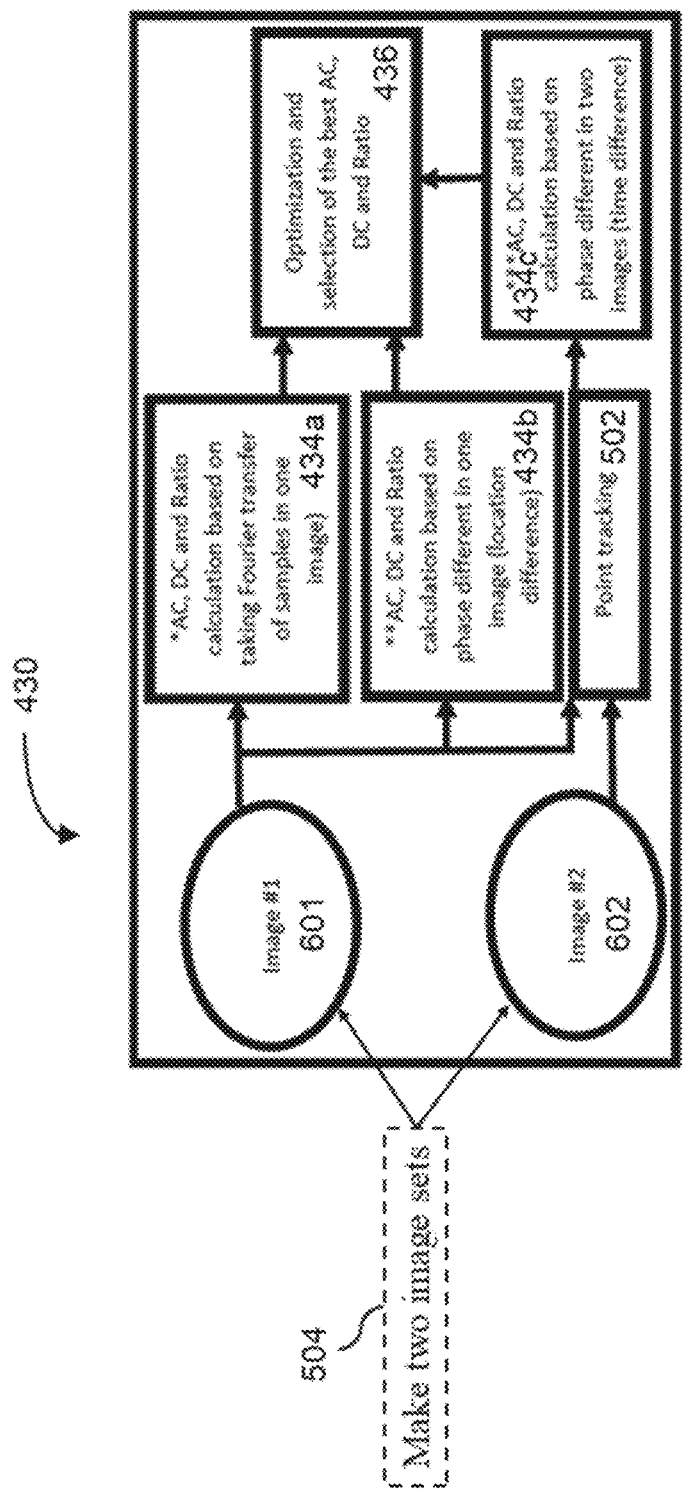
FIG. 6 is a flowchart of a method of extracting AC, DC, and AC/DC components, in accordance with embodiments.

Operation 430 may comprise a number of subparts and/or sub-steps. An example of extracting AC and DC components is shown in FIG. 5. At least three examples of pathways for accounting for phase when extracting AC, DC, and AC/DC are shown in FIG. 6. Each pathway may account for phase in a slightly different way. Improved accounting for phase in extraction of AC and DC may significantly decrease reconstruction errors and improve sensitivity.

At an operation 440, higher order components of the Fourier series may be extracted. Operation 440 may be optional. From the spatial frequency domain images both structural and functional parameters may be extracted from the Fourier components.

At an operation 450, the data may be normalized. With the AC and DC components for each pixel, the AC and DC components may be normalized. Rather than measuring relative to an external standard, such as AC and DC for a healthy individual, an internal standard may be used. The internal standard may relate to the absolute absorption of hemoglobin versus deoxyhemoglobin in the tissue. Normalization of the data may produce a value alpha which is explicitly related to a functional property of the tissue, e.g. blood oxygenation.

Normalization may comprise a mathematical relationship between the images at the two or more wavelengths. For example, normalized image data may comprise a ratio of the intensities at two wavelength ranges. For example, normalized image data may comprise a subtraction or a division of the intensities at two wavelength ranges. The data at the two wavelength ranges may be deconvolved. Different normalization methods as described elsewhere herein may be used for different image types. For example, normalization methods can be selected based on the image quality or penetration.

Figure 7:
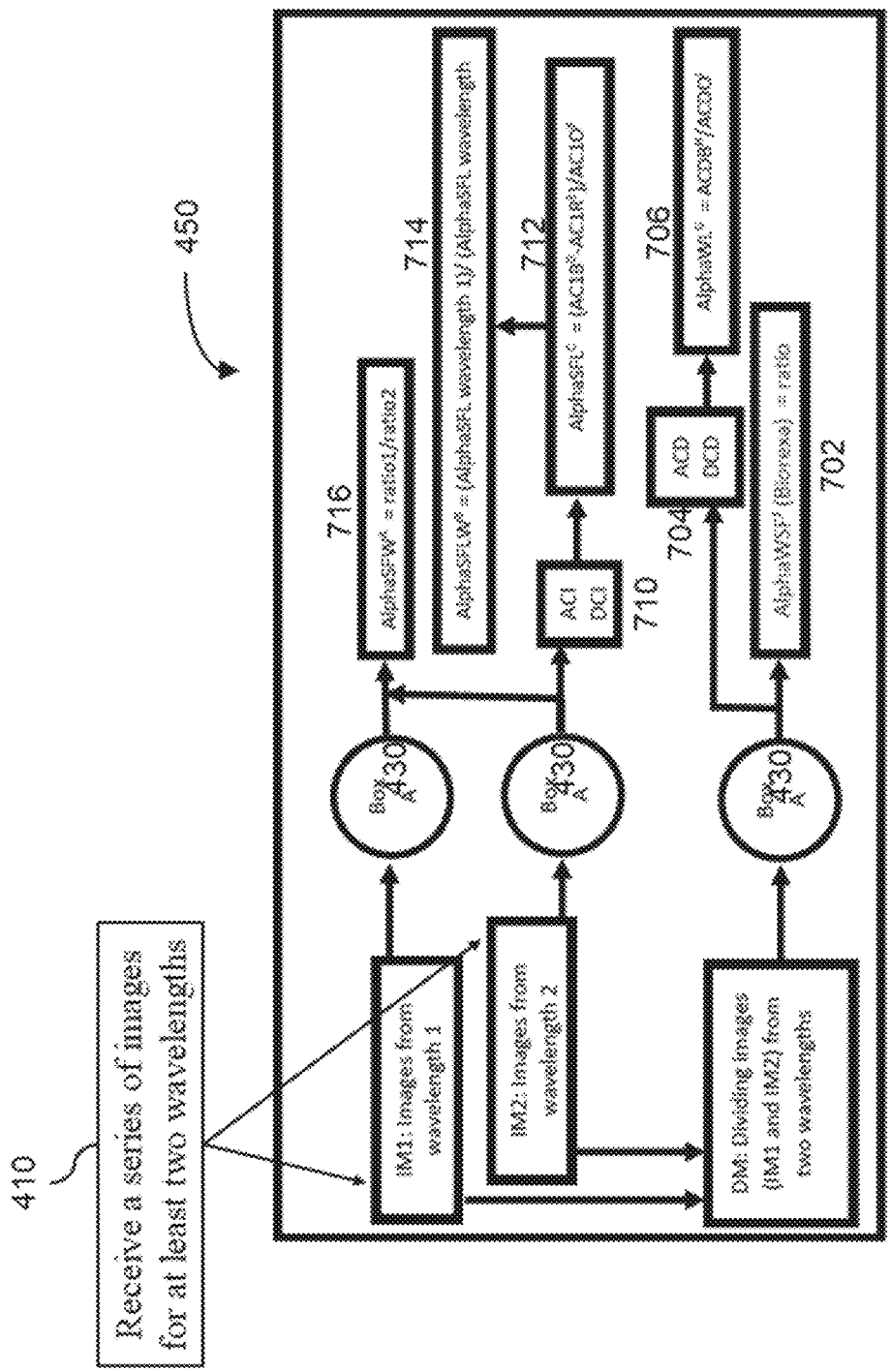
FIG. 7 illustrates a flowchart of a method of normalization of alpha data, in accordance with embodiments.

Operation 450 may comprise a number of subparts and/or sub-steps. At least five examples of pathways normalization are shown in FIG. 7. Each pathway may relate to a determination of one or more oxygen saturation analogues in different ways. Improved accounting for differences in the absorption of hemoglobin and deoxyhemoglobin may provide a functional map of blood oxygenation with an internal standard.

At an operation 460 a parameter alpha may be calculated. Each or a combination of the Alpha values may be used to identify various disorders related to retinal oxygenation including, but not limited to, glaucoma, diabetic retinopathy, age-related macular degeneration, retinal vein occlusion. Alzheimer's disease, choroidal disorders, stroke, cancer, retinal major diseases, etc. In addition to diagnostic applications, systems, devices, and methods disclosed herein may be used as a part of a longitudinal monitoring system. Systems, devices, and methods disclosed herein may aid point of care providers in assess retinal issues before visual quality decreases, before symptoms of visual degradation arise, etc.

At an operation 470, a statistical significance of the one or more Alpha values may be calculated. Operation 470 may be optional. In examples where more than one type of Alpha is calculated, a statistical significance of the Alpha value may be calculated. More than one type of Alpha may be calculate in examples where multiple types of normalization are performed, multiple types of AC and DC extraction are performed, when the order of the various normalization and AC and DC extraction steps are changed, etc. A statistical significance may comprise calculation of a p-value, a T-test, etc.

At an operation 480, other subject data may be incorporated into a disease model. Operation 480 may be optional. In some cases, the Alpha data measured by the methods and systems disclosed herein may include with other data such as diet, family history, age gender, and medical history in a predictive model for disease and/or for disease monitoring. For example, the onset of age-related macular degeneration may be correlated with gut health, for example, the gut microbiome. Retinal symptoms, including retinal thinning, may be an early warning sign of Alzheimer's especially in combination with other Alzheimer's symptoms. High oxygenation numbers may be related to diet and Diabetes status.

Although the above processes and steps show a method of analyzing an image comprising a pattern in accordance with some embodiments, a person of ordinary skill in the art will recognize many variations based on the teachings described herein. The processes and steps can be completed in a different order. Processes and steps can be added or deleted. Some of the processes and steps can comprise sub-processes and sub-steps of other processes and steps. Many of the processes and steps can be repeated as often as desired by the user.

Blurriness:

At an operation 440, higher order components of the Fourier series may be extracted. Operation 440 may be optional. In some cases, only functional parameters may be extracted. These higher order components may be related to the parameter DB (e.g., the degree of blurriness). The DB may be related to the level of abnormal capillary vascularity of the eye. Thus, DB may be related to a structural parameter of the eye. The presence of diabetic retinopathy (DR) may be correlated with a parameter DB which may be extracted from the transformed images. DB may generally relate to the number of harmonics in a Fourier series which minimizes the root mean squared error and/or the distribution within a 2D Fourier image. The data can be fit with a Fourier series with an increasing number of Fourier components. The addition of new harmonics can decrease the root mean squared error in the fit until the onset of over fitting, at which point the addition of new components no longer reduces the error. Images with patients without DR could be fit with a greater number of frequency components while still reducing RMS error. Patients with DR required few frequency components to fit the transformed data. Patient's with DR may have constricted or blood retinal blood vessels. They may also have angiogenesis, resulting in new thinner vessels. Other image artifacts from DR may include cotton wool spots, hemorrhage, and microaneurysms which may result in blurrier images, e.g. images which can be fit accurately with higher Fourier components. Similarly, the distribution within a 2D Fourier image can be extended.

Figure 10:
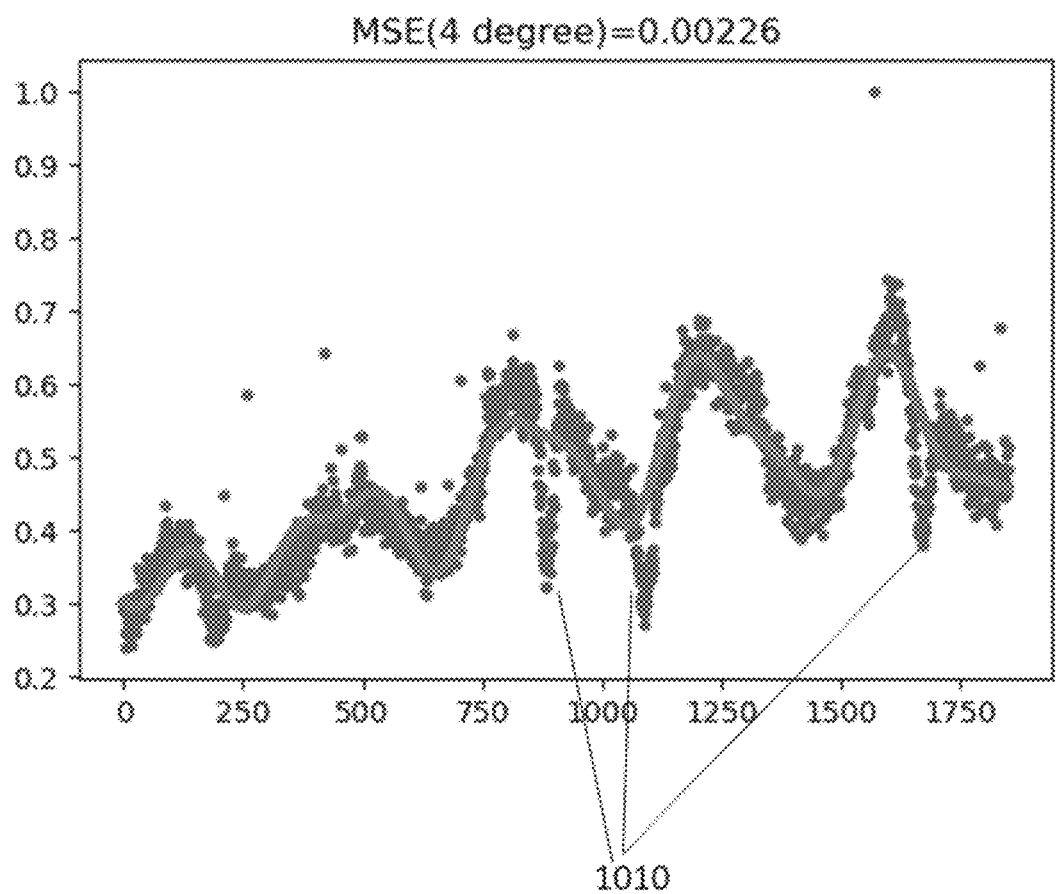
FIG. 10 is an example of a fit real space image for the determination of the degree of blurriness.

The DB may be calculated based on a single image. For example, the DB may be calculated using a single real space image. The DB may be calculated by fitting a modulated (e.g., spatially modulated) real space image to determine the quality of the fit. FIG. 10 is an example of a fit real space image for the determination of DB. The fit line may correlate to a fit of the modulation of the light source over the image. Outliers from this fit may be related to the presence of vasculature in the image. For example, troughs 1010 may correlate to the presence of large vasculature in the image. In cases where retinopathy has advanced, more deviations from the fit may be observed. For example, the mean square error (MSE) of the fit may increase with an increasing degree of blurriness.

Figure 11:
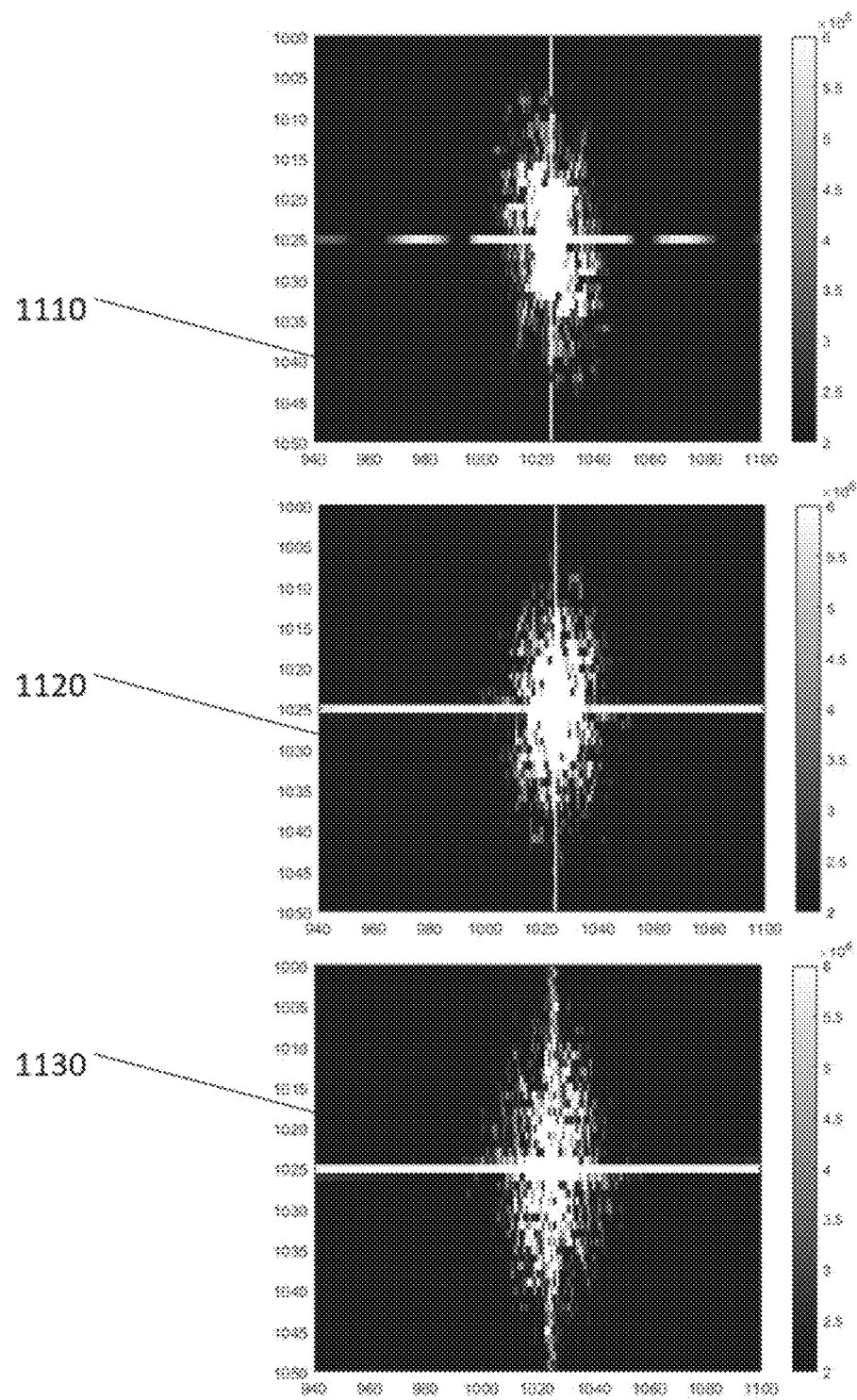
FIG. 11 is an example of a control Fourier transform, a diabetic retinopathy positive image, and a diabetic non-retinopathy image.

The DB may be calculated based on a Fourier space image. FIG. 11 is an example of a control Fourier transform 1110, a diabetic retinopathy positive image 1130, and a diabetic non-retinopathy image 1120. As seen in the control image, the Fourier space image is relatively centered and does not comprise additional spots around the central image. In the case of the retinopathy positive image, a number of additional spots appear further from the center of the transform, which may be correlated to the presence of additional disorder in the image due to the presence of additional small vasculature. The diabetic non-retinopathy image may have aspects of the other two images, such as a presence of additional higher frequency spots, but not enough to qualify as having retinopathy.

Alpha Calculation:

FIG. 5 is a flowchart of a method 500 of extracting AC, DC, and AC/DC components, in accordance with embodiments. At an operation 420, a transform of an image may be performed, for example, as described herein above with respect to FIG. 4. In some cases, each image or portion thereof may be individually transformed. For example, each snapshot at each wavelength may be individually transformed. In some cases, each image or portion thereof may be batch transformed. Operations 432, 434, 436, and 438 may comprise sub-operations of the operation 430, for example, as described herein above with respect to FIG. 4. Method 500 is an example of a method of extracting AC, DC, and AC/DC which may be used in combination with FIG. 4. Alpha may be related to a functional property of the eye.

At an operation 432, the transformed data may be fit. At an operation 434, a phase of a point of interest (POI) in each image may be calculated. Operation 434 may comprise comparing a phase of a point of interest in a first image at a first time to a point of interest in a second image at a second time. Operation 434 may comprise comparing a phase of a first point of interest in a first location in a first image to a second point of interest in a second location in the first image. Operation 434 may, optionally, include POI tracking data 502, such as eye tracking data. For example, the POI tracking data may line up a first POI in a first image with a second POI in a second image for phase calculation. FIG. 6 provides at least three examples of an operation 434.

At an operation 436, AC, DC, and K may be calculated for a plurality of images or a plurality of sets of images. Many snapshots of the tissue may be taken and at two or more wavelengths. A combined map of AC and DC values for the tissue may be determined. The combined map may comprise values of AC and DC which best fit all of the image data within a threshold error condition. The fit may be a least squares fit.

Operation 436 may optionally include operations 504 and 506. At an operation 504, two sets of images may be created. In some cases, the first set comprises images at a first wavelength and the second set comprises images at a second wavelength. In some cases, the first set comprises images from a first window of time of the two or more wavelengths. For example, a first set may comprise every other snapshot and a second set may comprise the remainder of the total. At an operation 506, AC, DC, and K may be calculated for each of the two or more sets of images. Operation 436 may comprise finding a combined AC, DC, and K for the image sets. FIG. 6 provides an example of an operation 436.

Operation 438 may comprise outputting the combined AC, DC, and K. The output may be with the normalized data to calculate a parameter related to blood oxygenation. The output may be included in a method 400 described herein above with respect to FIG. 4.

Although the above processes and steps show a method of extracting AC, DC, and AC/DC components, a person of ordinary skill in the art will recognize many variations based on the teachings described herein. The processes and steps can be completed in a different order. Processes and steps can be added or deleted. Some of the processes and steps can comprise sub-processes and sub-steps of other processes and steps. Many of the processes and steps can be repeated as often as desired by the user.

FIG. 6 is a flowchart of a method of accounting for phase when extracting AC, DC, and AC/DC components, in accordance with embodiments. The components AC, DC, and AC/DC may be related to a parameter Alpha, which may be directly proportional to the oxygenated hemoglobin absorption. Three pathways for extracting AC, DC, and AC/DC are shown in FIG. 6. Saccadic eye movement of the tissue may result in changes in the location of the origin of reflected light from sample to sample. The present disclosure may provide way to account for these phase changes and, in some case, to use the saccadic movement to improve calculation of blood oxygenation or blood oxygenation analogues.

At an operation 504, two image sets may be created. An example of operation 504 is provided herein with respect to FIG. 5. A first image 601 may comprise one or more images within a first set, and a second image 602 may comprise one or more images with a second set. At an operation 434, a phase of a point of interest (POI) in each image may be calculated. The phase may be accounted for using one or more of pathways 434a, 434b, and 434c. At an operation 436, the combined AC, DC, and K may be output.

In pathway 434a, a single image 601 (e.g. at a single wavelength) at two or more different time points may be used. In pathway 434a, phase may be assumed to be the same between images, and the AC, DC, and AC/DC components can be extracted from the Fourier transform. The ratio AC/DC may be calculated from the extracted components. In pathway 434c, movement of the eye may provide samples of different locations of the eye, thereby providing different points illuminated by different phases of light.

In pathway 434b, a single image 601 (e.g. at a single wavelength); however, two locations in the same image may be used. In some cases, there may be less or no phase difference because there is no time delay between the two points, as in 434a, but there may be a phase difference due to the modulation of the light projected on the image. For the two locations, the phase may be assumed to be different.

In pathway 434c, image 601 and a second image 602 may be used. Point tracking 502 may be used to track a position of a region of interest from image 601 to image 602. The phase may be explicitly different between image 601 and image 602. In pathway 434c, the AC and DC components may be assumed to be different. Physically, this assumption may correspond to assuming the physical properties of the tissue did not change between images, but that the different phases of the mask result in different phases illuminating the tissue. In some cases, multiple pairs of points in the two or more images may be considered. For example, a series of points along a blood vessel in image 601 and image 602 may be considered.

At an operation 436, a value of AC and DC for the various points in the image of the tissue may be calculated. Operation 436 may utilize one or more of pathways 434a, 434b, and 434c. For example, if the image quality is low enough to make point tracking difficult, pathways 434a and 434b may be considered without pathway 434c. If the feature in the image is small, e.g. a small blood vessel, pathway 434c may be used without pathway 434a and 434b. Redundancy and adaptability of the phasing process may allow for images of varying qualities to be used.

Although the above processes and steps show a method of accounting for phase when extracting AC, DC, and AC/DC components, a person of ordinary skill in the art will recognize many variations based on the teachings described herein. The processes and steps can be completed in a different order. Processes and steps can be added or deleted. Some of the processes and steps can comprise sub-processes and sub-steps of other processes and steps. Many of the processes and steps can be repeated as often as desired by the user.

FIG. 7 illustrates a flowchart of a method of normalization of alpha data, in accordance with embodiments. The method of FIG. 7 may be an example of operation 450. The optical properties of the superficial blood vessels and the retina of a patient with diabetic retinopathy (DR) may be different from those of healthy people due to the higher blood oxygen level, lack oxygen in the tissue, and increase in reactive oxygen/nitrogen species. These differences in absorption and scattering coefficient affect the reflect light back from the superficial blood vessels and the retina. With the AC and DC components for each pixel, the AC and DC components may be normalized. Rather than measuring relative to an external standard, such as an epoxy-based standard, an internal standard may be used. Due to the limited access to the retina, such an external standard may not be possible to use. The internal standard may relate to the absolute absorption of hemoglobin versus deoxyhemoglobin in the tissue. Normalization of the data may produce a value alpha which is explicitly related to a functional property of the tissue, e.g. blood oxygenation.

FIG. 7 shows three methods of normalizing the AC and DC data for each of the two or more wavelengths to produce a value alpha. Device 100 may collect two types of images simultaneously or nearly simultaneously. At operation 410, the processor may receive images for at least two wavelengths. Alternatively, the processor may receive images for a single wavelength. The images may comprise one image from each of at least two detectors, e.g. IM1 and IM2. In some cases, the first detector may collect an image at about 560 nm and the second detector may collect an image at about 655 nm. These wavelengths correspond to relevant positions in the absorption spectrum of hemoglobin. Hemoglobin and deoxyhemoglobin comprise nearly the same optical absorption in the range of 560 nm. At 655 nm, the extinction coefficient of deoxyhemoglobin is nearly an order of magnitude higher than oxygenated hemoglobin. From these two types of images a third image can be created by dividing the two images, the resultant image corresponds to the ratio of the absorption at about 655 nm to the absorption at about 560 nm (DM). The image DM may be expressed as IM1/IM2. The ratio of absorption at about 655 nm to the absorption at about 560 nm relates to the absolute oxygen concentration in the tissue. Each of the following normalization pathways may use this relationship; however, in each pathway the step of normalization may differently account for functional differences related to the biological structure being imaged.

In some cases, the image DM may be formed. Subsequently, the AC for the DM image (ACD), DC for the DM image (DCD), and the ratio ACD/DCD may be calculated based on an operation 430. The operation 430 may comprise one or more sub-operations as described herein with respect to FIG. 6. The resulting 2D image of the ratio ACD/DCD for each point in the image may comprise the value AlphaWSF, 702. Other methods may be used to determine AlphaWSF such as, for example, the methods described elsewhere herein. For example, a non-division based method may be used to determine AlphasWSF. The value AlphaWSF relates to the frequency normalized absorption (W) and with scattering accounted for by the spatial frequency (SF). The value AlphaWSF does not account for differences in location. For example, in determining progression of diabetic retinopathy, it may be useful to know a difference in blood oxygenation between the optic disc (which is the major entry point for blood vessels supplying the retina) and blood vessels that are further from the optic disc. Examples of other alphas include, but are not limited to, $$\frac{(DCB-ACB)}{DCB}, \frac{(ACB/AC0)_{w1}}{(ACB/AC0)_{w2}}, \frac{(ACB/ACR)_{w1}}{(ACB/ACR)_{w2}},$$

$$\frac{(ACDB/ACDR)_{w1}}{(ACDB/ACDR)_{w2}}, \frac{ACB}{(DCB-ACO)}, \frac{ACB}{(DCB-ACR)},$$

for one or two wavelengths. Such alphas may be used as machine learning inputs.

Alternative methods of normalization may be utilized in addition to the multiple wavelength based normalization of FIG. 7. For example, a single pixel-based normalization can be used where the AC component is normalized to the DC component of that pixel (e.g., AC/DC). Such pixel-based normalization can be repeated for each pixel of an image to generate a normalized image. In another example, a two-location normalization can be performed whereby the spatial modulation of light within the image is used to normalize the image. In this example, equations such as, for example, $$\frac{R_0}{R_{0s}} = \frac{A_{0s}}{A_0} \text{ and } \frac{R_f}{R_{fs}} = \frac{A_{fs}}{A_f}$$

can be used to generate normalized signals.

A benefit of the normalization methods described elsewhere herein can be the replacement of a reference normalization with a self-normalization. Reference normalizations can use reference materials with know reflectivity/absorbance to calibrate an instrument. Such normalizations can be costly in terms of time used and materials and may have to be repeated for each patient. Using self-normalization techniques (e.g., normalizing a signal to another portion of the same eye) can remove this need, simplifying the calibration of systems described elsewhere herein.

Figure 8:
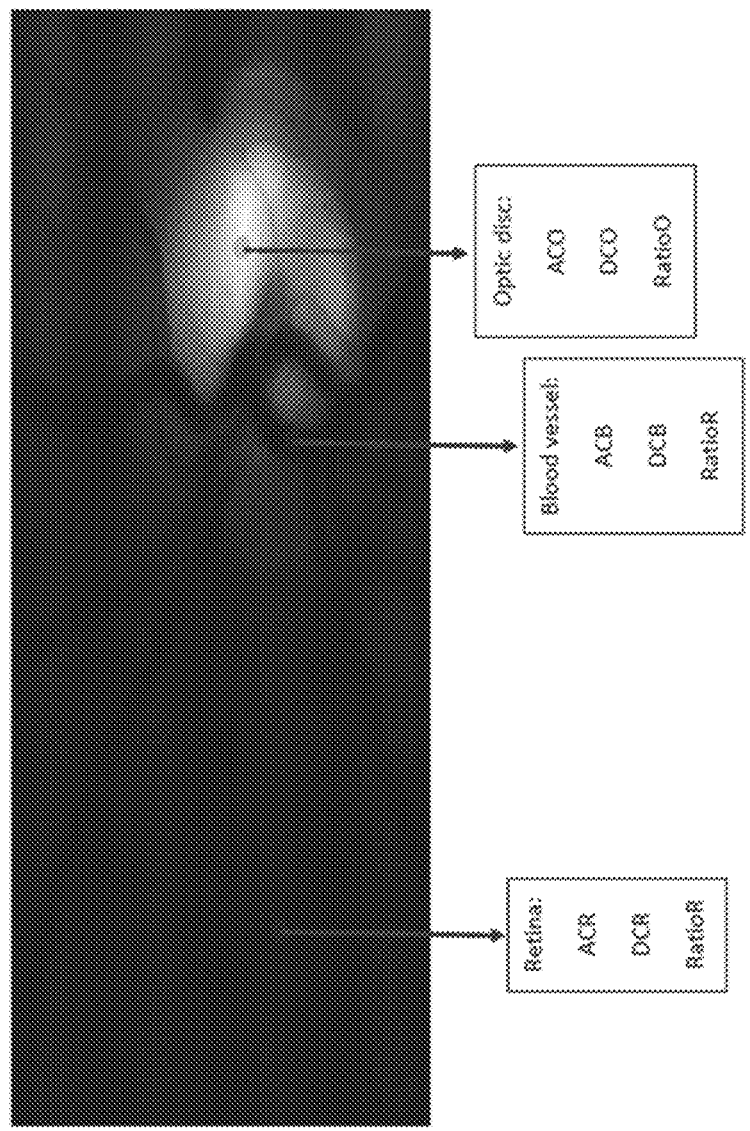
FIG. 8 illustrates various sampling locations on an image of a retina, in accordance with embodiments.

FIG. 8 illustrates various sampling locations on an image of a retina, in accordance with embodiments. On the optic disc, the parameters AC optic disc (ACO), DC optic disc (DCO), and the ratio ACO over DCO (RatioO) may be sampled, as shown. On a blood vessel, the parameters AC blood vessel (ACB), DC blood vessel (DCB), and the ratio ACB over DCB (RatioB) may be sampled, as shown. On the retina, the parameters AC retina (ACR), DC retina (DCR), and the ratio ACR over DCR (RatioR) may be sampled, as shown. These parameters may be used to calculate oxygen saturation analogues as described elsewhere herein.

Referring back to FIG. 7, the parameter AlphaWL, 706, may be calculated from the DM image. At an operation 704, the AC for the DM image (ACD) and DC for the DM image (DCD) may be provided as an output from the operation 430. The operation 430 may comprise one or more sub-operations as described herein with respect to FIG. 6. AlphaWL may be calculated from the blood vessel ACD value (ACDB) divided by the optic disc ACD value (ACDO). As shown AlphaWL is normalized first based wavelength, then on spatial frequency, and then by location.

In some cases, the parameter AC and DC may be extracted for each of image IM1 and IM2 using the operation 430. The operation 430 may comprise one or more sub-operations as described herein with respect to FIG. 6. At an operation 710, the AC for the IM1 or IM2 image (ACI) and DC for the IM1 or IM2 image (DCI) may be provided as an output from the operation 430. The operation 430 may comprise one or more sub-operations as described herein with respect to FIG. 6. At an operation 712, for wavelength 1, the AC component at various positions may be sampled including the blood vessel (AC1B), the retina (AC1R), and the optic disc (AC1O). AlphaSFL for wavelength one may be calculated as (AC1B−AC1R)/AC1O. AlphaSFL for wavelength 2 may be calculated similarly. AlphaSFL normalizes first by spatial frequency then by location, but wavelength is not considered.

At an operation 714, the AlphaSFL from wavelength 1 may be divided by AlphSFL from wavelength 2 to yield AlphaSFLW. The ratio at 714, brings in location based normalization to the blood oxygenation saturation analogue term. AlphaSFLW normalizes first by spatial frequency, then by location, and finally by wavelength.

In some cases, the ratio of the parameters AC and DC (AC/DC) may be extracted for each of image IM1 and IM2 using the operation 730. The operation 430 may comprise one or more sub-operations as described herein with respect to FIG. 6. At an operation 716, the two ratios may be divided to produce the value AlphaSFW. AlphaSFW and AlphaWSF may not consider differences in the oxygenation by location. In some cases, AlphaSFW and AlphaWSG may be represented as 2D Alpha images, e.g. an oxygenation analogue map. In some cases, a location based AlphaWSF may be considered by sampling AlphaWSF at various locations similar to the other methods described above.

Figure 12:
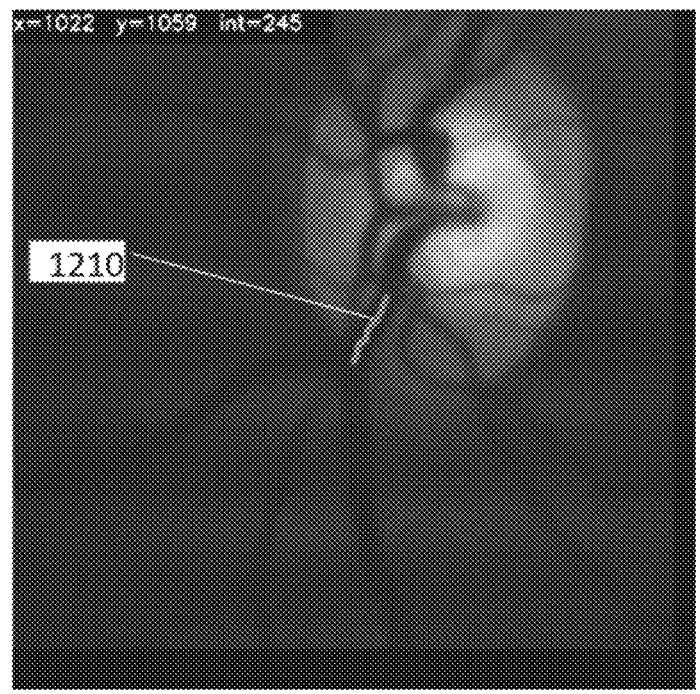
FIG. 12 is an example of a line scan sample of an image of an eye.

Though described herein with respect to using Fourier transforms to determine parameters related to blood oxygenation, other methods may be employed to determine such parameters. FIG. 12 is an example of a line scan sample of an image of an eye. The line scan 1210 may be taken over a single blood vessel. The real space data of the line scan may be converted to Fourier space via a one-dimensional Fourier transform (1DFFT). The 1DFFT may show peaks corresponding to the frequency components of the line scan. The peaks may comprise a peak for the spatial frequency (e.g., the frequency generated by the spatial modulation of the light source). The 1DFFT may show peaks corresponding to the AC and DC components of the image, which may be different from the spatial frequency. Such peaks may then be used as described elsewhere herein.

Figure 13:
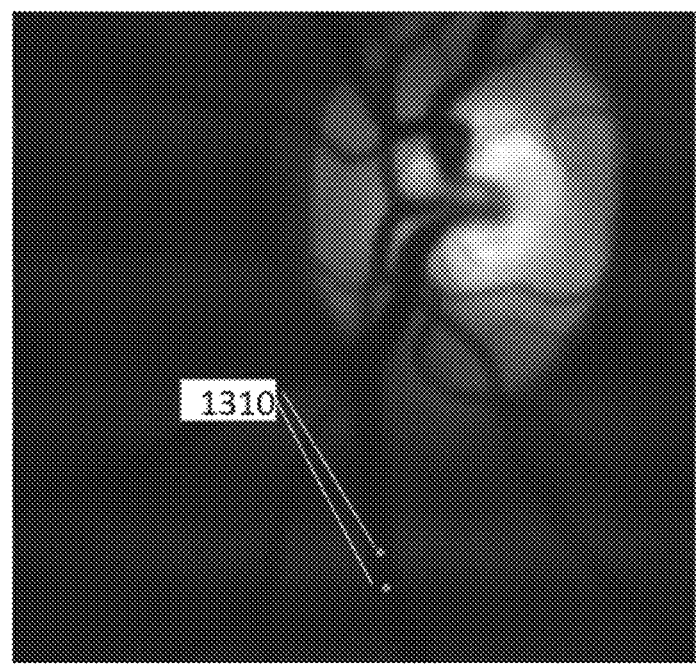
FIG. 13 is an example of a single image that can be used to determine AC and DC components in real space.

FIG. 13 is an example of a single image that can be used to determine AC and DC components in real space. The image may comprise a plurality of sample points 1310. The sample points may be on a same blood vessel. When the sample points are on a same blood vessel, the oxygenation measured at each point may be assumed to be constant. For example, the blood oxygenation of a vessel may be the same over a small distance separating the sample points. The sample points may be in different illumination conditions (e.g., in different illumination conditions based on the spatial field illumination of the sample). The different illumination conditions may be such that the AC and DC components may be derived based off of the phase information for each of the sample points. For example, operation 434b of FIG. 6 can be a determination of the AC, DC, and ratio information based off of a plurality of points in a single image.

Additionally, a plurality of images may be used to determine oxygen saturation analogues. A first image of an eye may be taken under a first illumination condition. The first illumination condition may comprise a projection of a first spatial frequency of light onto the eye. A point on a blood vessel of the eye may be selected and measured. After a time, movement of the eye (e.g., saccadic movement) can move the selected point and a second image can be taken. Due to the movement of the eye, the point may be located in a different portion of the spatial field, and thus in a second illumination condition. The point may again be measured, and the two values from the first and second images may be used to determine parameters as described elsewhere herein (e.g., AC, DC, etc.). By using saccadic movement of the eye, different illumination conditions may be utilized without changing the spatial modulation of the light source, thereby reducing the complexity of the system. Additionally, by using a natural movement of the eye that is otherwise regarded as detrimental to the quality of images and data collected, the present disclosure improves the ease and accuracy with which oxygen saturation analogues can be determined.

Although the above processes and steps show a method of normalizing alpha data, a person of ordinary skill in the art will recognize many variations based on the teachings described herein. The processes and steps can be completed in a different order. Processes and steps can be added or deleted. Some of the processes and steps can comprise sub-processes and sub-steps of other processes and steps. Many of the processes and steps can be repeated as often as desired by the user.

In some embodiments, the platforms, systems, media, and methods described herein include a digital processing device (e.g. a processor) or use of the same. In further embodiments, the digital processing device includes one or more hardware central processing units (CPUs), general purpose graphics processing units (GPGPUs), or field programmable gate arrays (FPGAs) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers. Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations. In some embodiments, the digital processing device includes an operating system configured to perform executable instructions. The operating system is, for example, software, including programs and data, which manages the device's hardware and provides services for execution of applications.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

Figure 9:
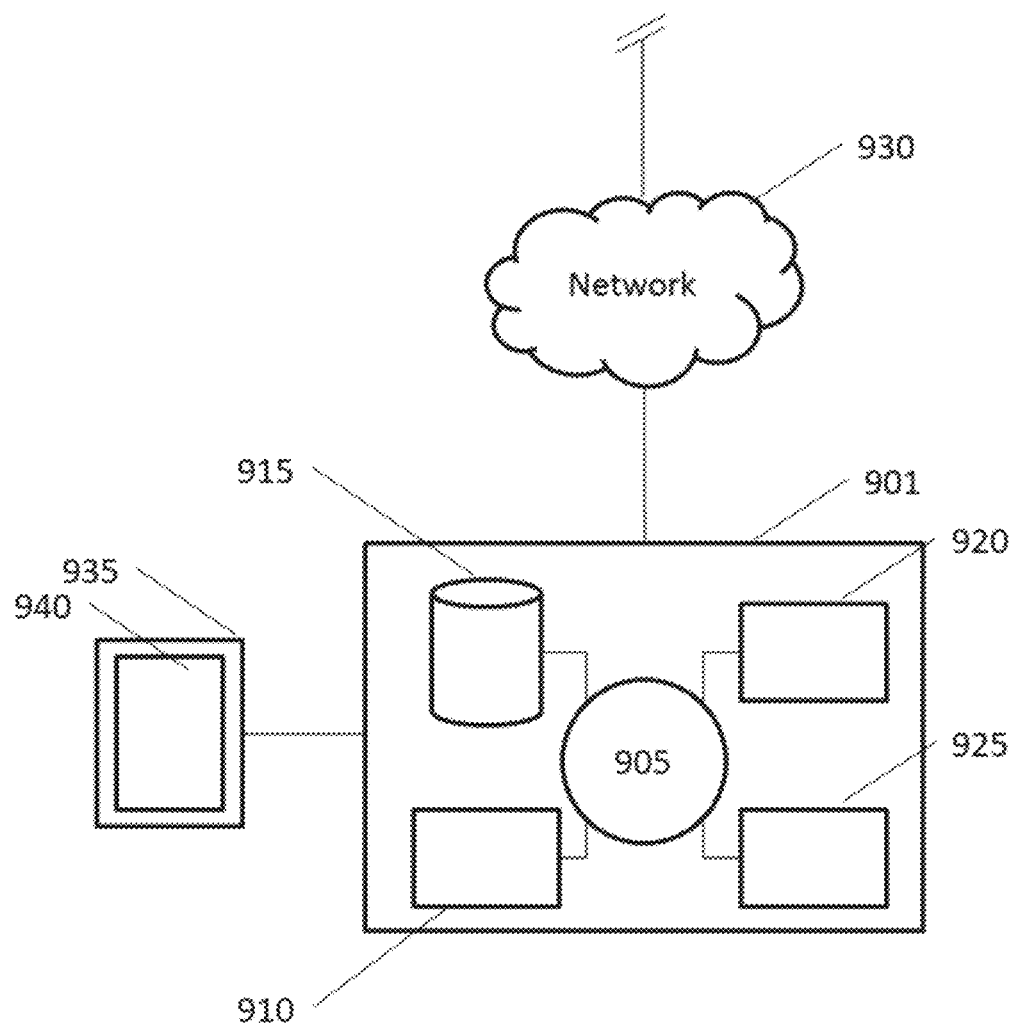
FIG. 9 illustrates a computer control system that is programmed or otherwise configured to implement methods provided herein.

Referring to FIG. 9, in a particular embodiment, an example digital processing device 901 is programmed or otherwise configured control the systems and methods as described herein. The device 901 can regulate various aspects of the systems and methods of the present disclosure, such as, for example, performing processing steps. In this embodiment, the digital processing device 901 includes a central processing unit (CPU, also "processor" and "computer processor" herein) 905, which can be a single core or multi core processor, or a plurality of processors for parallel processing. The digital processing device 901 also includes memory or memory location 910 (e.g., random-access memory, read-only memory, flash memory), electronic storage unit 915 (e.g., hard disk), communication interface 920 (e.g., network adapter) for communicating with one or more other systems, and peripheral devices 925, such as cache, other memory, data storage and/or electronic display adapters. The memory 910, storage unit 915, interface 920 and peripheral devices 925 are in communication with the CPU 905 through a communication bus (solid lines), such as a motherboard. The storage unit 915 can be a data storage unit (or data repository) for storing data. The digital processing device 901 can be operatively coupled to a computer network ("network") 930 with the aid of the communication interface 920. The network 930 can be the Internet, an internet and/or extranet, or an intranet and/or extranet that is in communication with the Internet. The network 930 in some cases is a telecommunication and/or data network. The network 930 can include one or more computer servers, which can enable distributed computing, such as cloud computing. The network 930, in some cases with the aid of the device 901, can implement a peer-to-peer network, which may enable devices coupled to the device 901 to behave as a client or a server.

Continuing to refer to FIG. 9, the CPU 905 can execute a sequence of machine-readable instructions, which can be embodied in a program or software. The instructions may be stored in a memory location, such as the memory 910. The instructions can be directed to the CPU 905, which can subsequently program or otherwise configure the CPU 905 to implement methods of the present disclosure. Examples of operations performed by the CPU 905 can include fetch, decode, execute, and write back. The CPU 905 can be part of a circuit, such as an integrated circuit. One or more other components of the device 901 can be included in the circuit. In some cases, the circuit is an application specific integrated circuit (ASIC) or a field programmable gate array (FPGA).

Continuing to refer to FIG. 9, the storage unit 915 can store files, such as drivers, libraries and saved programs. The storage unit 915 can store user data, e.g., user preferences and user programs. The digital processing device 901 in some cases can include one or more additional data storage units that are external, such as located on a remote server that is in communication through an intranet or the Internet.

Continuing to refer to FIG. 9, the digital processing device 901 can communicate with one or more remote computer systems through the network 930. For instance, the device 901 can communicate with a remote computer system of a user. Examples of remote computer systems include personal computers (e.g., portable PC), slate or tablet PCs (e.g., APPLE® IPAD. SAMSUNG® GALAXY TAB), telephones, Smart phones (e.g., APPLE® IPHONE, ANDROID-enabled device. BLACKBERRY®), or personal digital assistants.

Methods as described herein can be implemented by way of machine (e.g., computer processor) executable code stored on an electronic storage location of the digital processing device 901, such as, for example, on the memory 910 or electronic storage unit 915. The machine executable or machine readable code can be provided in the form of software. During use, the code can be executed by the processor 905. In some cases, the code can be retrieved from the storage unit 915 and stored on the memory 910 for ready access by the processor 905. In some situations, the electronic storage unit 915 can be precluded, and machine-executable instructions are stored on memory 910.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a KINECT®, LEAP MOTION®, or the like. In still further embodiments, the input device is a combination of devices such as those disclosed herein.

The digital processing device 901 can include or be in communication with an electronic display 935 that comprises a user interface (UI) 940. Examples of UI's include, without limitation, a graphical user interface (GUI) and web-based user interface. In some cases, electronic display 935 may be connected to the computer system 901 via a network, e.g., via network 930.

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects. Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL®, DELPHI®, EIFEEL®, JAVA™, LISP®, PYTHIN™, VISUAL BASIC®, and VB .NET, or combinations thereof. Compilation is often performed, at least in part, to create an executable program. In some embodiments, a computer program includes one or more executable complied applications.

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

In some embodiments, the platforms, systems, media, and methods disclosed herein include one or more databases, or use of the same. In view of the disclosure provided herein, those of skill in the art will recognize that many databases are suitable for storage and retrieval of information. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

In some embodiments, the platforms, systems, media, and methods disclosed herein may include one or more computer programs comprising a user interface, e.g., a graphical user interface. The user interface may allow the user to control one or more aspects of the systems, methods, and devices disclosed herein. For example, the interface may allow the user to view one or more images simultaneously. The interface may present a first image at a first wavelength and a second image at a second wavelength simultaneously. The user may be able to adjust a position or a focus of the device in relation to the one or more images. The user may provide instruction to collect one or more images via the user interface. The user may indicate one or more image parameters, such as exposure time, number of images, time between images, etc. The user may indicate where the collected images are to be stored. The user may call for previously stored images. The user may indicate the method to be used to normalize the data. The user may indicate the method to be used to account for phase and extract AC, DC, and AC/DC. The user may indicate which points are along a blood vessel to aid in eye tracking. The user may indicate to near positions in an image in order determine AC, DC, and AC/DC, if necessary, depending on the method used. The user may indicate how many Fourier components should be used to fit the data.

The user-interface may be easy to use for a user such as a clinician. In some cases, the user interface provides the user access to related patient records such as age, medical history, family history, diet, gender, etc. The user interface may flag problem areas to a user. The user interface may provide a classification or a likelihood of a classification of a tissue. The user interface may provide a visual map of the blood oxygenation analogues. The user interface may highlight areas of poor oxygenation or healthy oxygenation.

The following examples are illustrative of certain systems and methods described herein and are not intended to be limiting.

Example 1—Comparing Oxygen Saturation Analogues in Retinal Images

Figure 14:
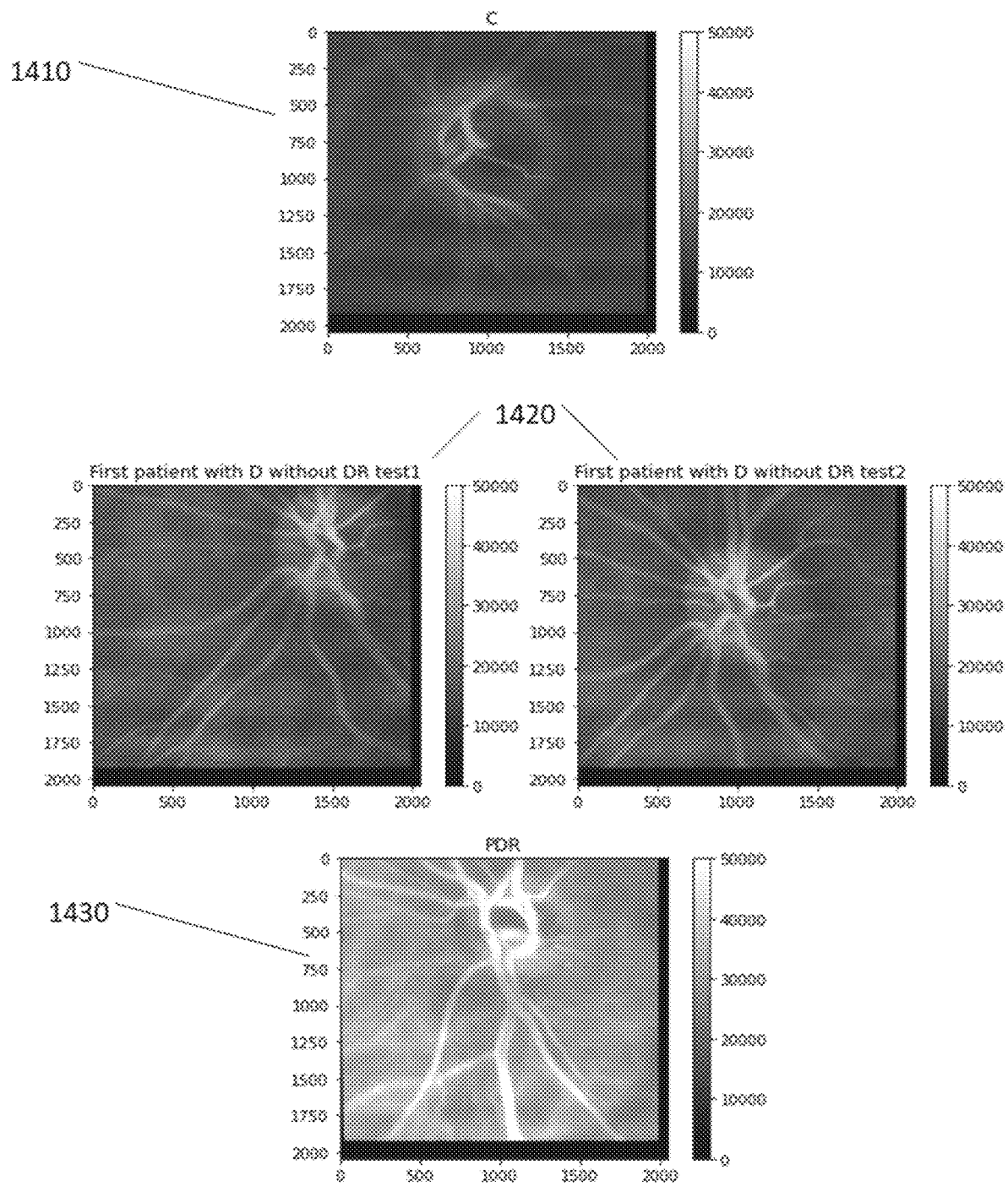
FIG. 14 is an example of a map of an oxygen saturation analogue for different patients.

FIG. 14 is an example of a map of an oxygen saturation analogue for different patients. 1410 is an example of a control patient who is neither diabetic nor presenting retinopathy. As can be seen, the image may have a generally low value of the oxygen saturation analogue, with most of the saturation being present within the larger blood vessels of the eye and tissue. 1420 is an example of two different images a retina of a patient who is diabetic but does not present retinopathy taken six months apart (the left image taken six months before the right image). As compared to the control patient, the diabetic patient has a higher baseline (e.g., the retina has a higher baseline saturation), which may correspond to more small capillary blood vessels on the retina, but overall the image looks similar to the control. The progression of the retinopathy can be seen in the increased value of the oxygen saturation analogue in the later image. 1430 is an example of a retinal image of a patient with diabetic retinopathy. The value of the oxygen saturation analogue in both the large blood vessels of the patient, as well as the overall level, are highly elevated as compared to both the control and the patient with diabetes but not retinopathy. Such images of the oxygen saturation analogue may be generated by the methods and systems described elsewhere herein.

Figure 15:
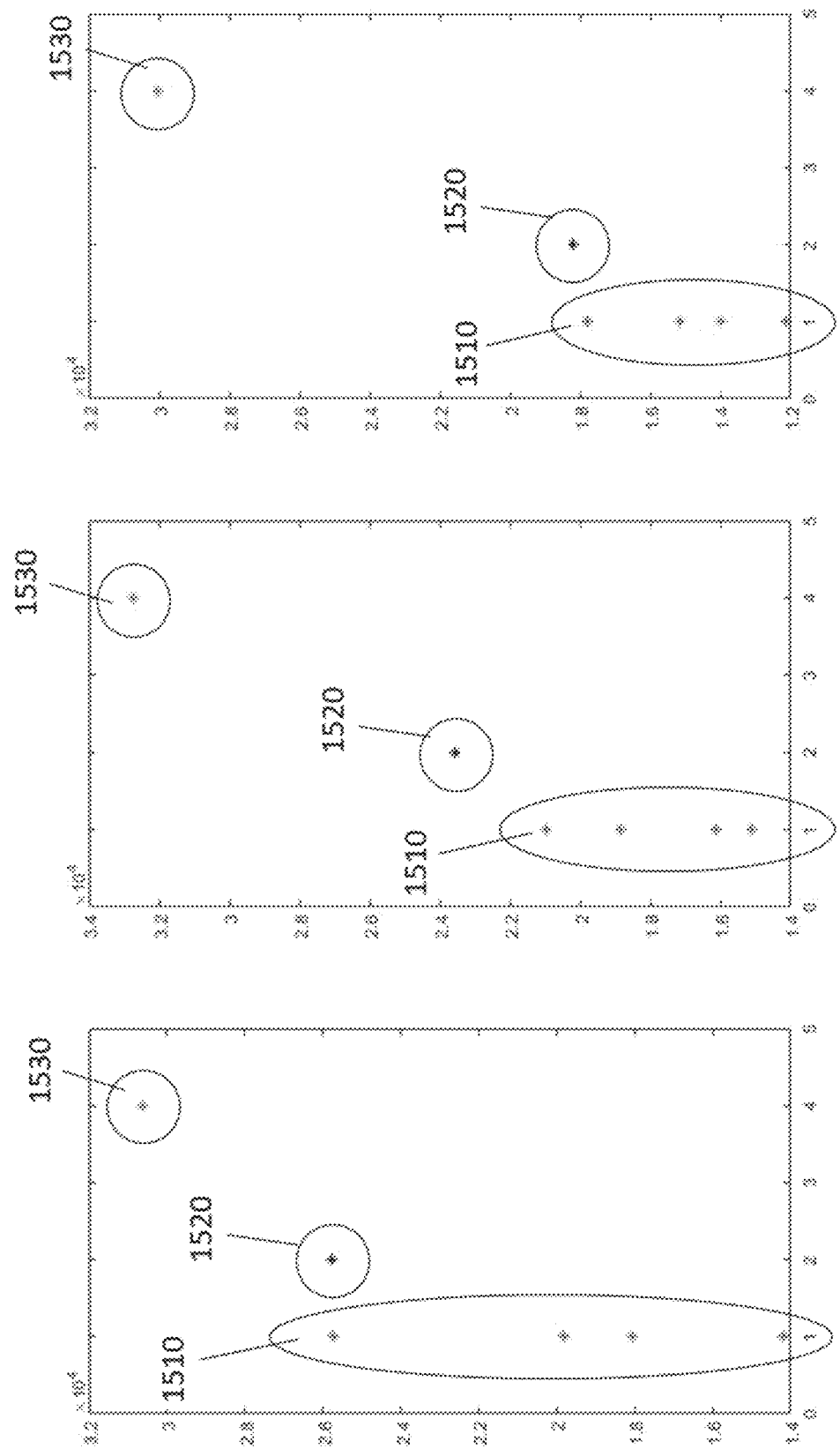
FIG. 15 is an example of alpha parameters taken in different locations in an eye of a patient.

FIG. 15 is an example of alpha parameters taken in different locations in an eye of a patient. Points 1510 are alpha parameters derived from a control patient, while points 1520 are derived from a diabetic patient without retinopathy, and points 1530 are from a diabetic patient with retinopathy. As can be observed, the alpha parameter for the diabetic patient may be significantly separated from the other patients, which can permit identification of diabetic retinopathy earlier than other techniques.

Example 1—Analyzing Modulated Images

Figure 16:
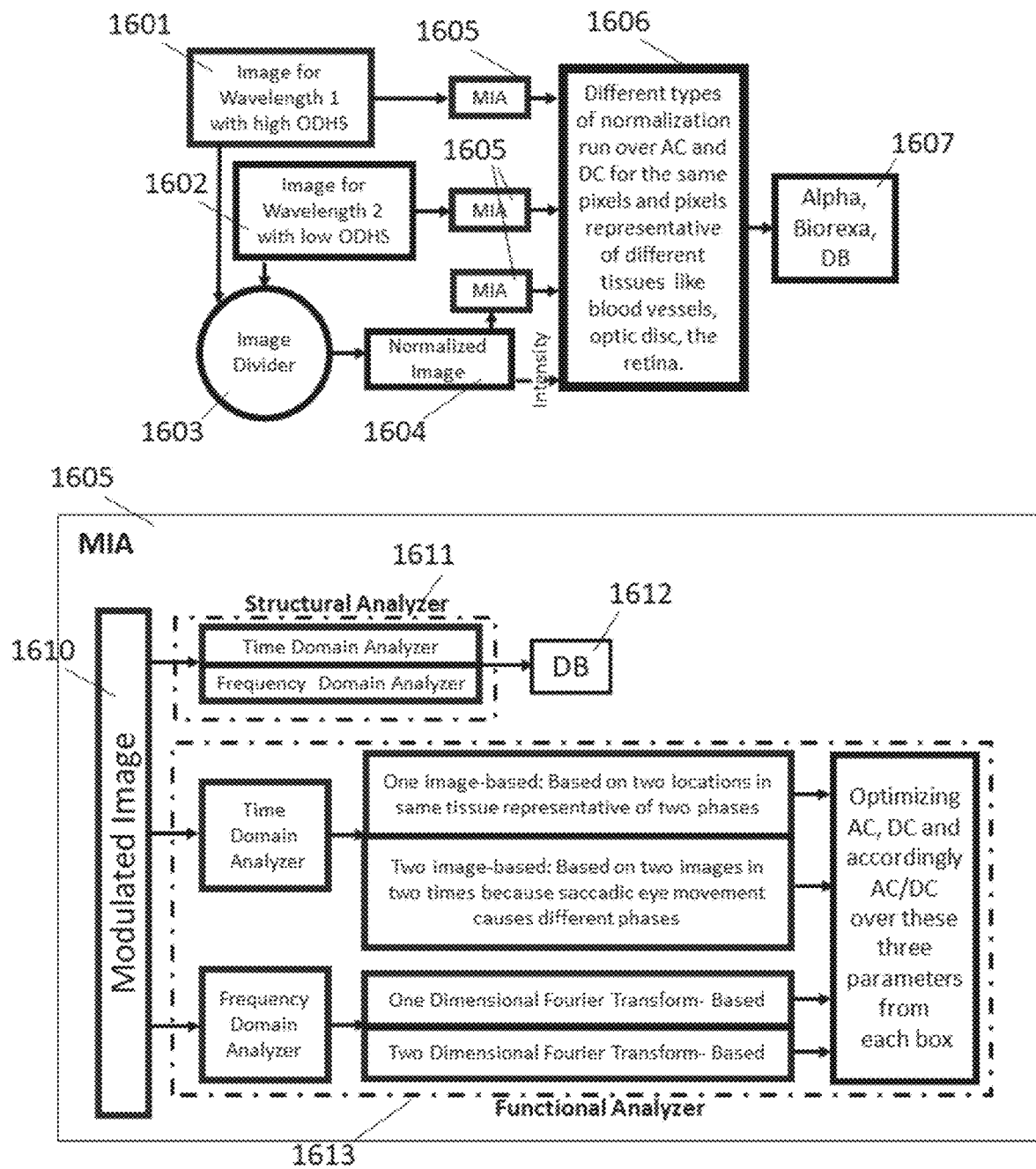
FIG. 16 is a flowchart for analyzing modulated images, according to an embodiment.

FIG. 16 is a flowchart for analyzing modulated images, according to an embodiment. A first image 1601 and a second image 1602 can be provided. The first image may have a high oxy-deoxy hemoglobin saturation differences (ODHSD), while the second image can have a low ODHSD. The images can be supplied to an image divider as described elsewhere herein to generate a normalized image 1604. Alternatively or additionally, the first, second, and/or normalized images may be subjected to process 1605.

Process 1605 may start with a modulated image 1610 (e.g., 1601, 1602, 1604, etc.). For calculations of structural properties (e.g., DB), the modulated image may be subjected to analysis using structural analyzer 1611. The structural analyzer may be as described elsewhere herein. For example, the structural analyzer can use the amount of AC signal in a Fourier image to estimate the degree of blurriness of an eye. In another example, the structural analyzer can perform a fit to a real space image to determine an MSE correlated with DB. The analysis of the structural analyzer can generate output 1612. Though shown in this example as DB, any structural parameter may be determined as described elsewhere herein.

The functional analyzer 1613 may comprise one or more domain analyzers. Examples of analyzers include time/spatial domain analyzers and frequency domain analyzers. The one or more domain analyzes may be configured to process the modulated image as described elsewhere herein. For example, a spatial domain analyzer can be configured to analyze a single real space image based on two locations within the image (e.g., two different points on a same blood vessel). In another example, the time domain analyzer can be configured to use the same point in two images where the saccadic movement of the eye caused the point to be in two different illumination conditions (e.g., two different phase conditions). Examples of frequency domain analyzers include, but are not limited to, one and two-dimensional Fourier transform based analyzers as described elsewhere herein. The output of the functional analyzer may comprise AC, DC, ratios thereof, and other parameters as described elsewhere herein. The outputs may be input into a normalization process 1606

The normalization process 1606 may be as described elsewhere herein. For example, the image can be normalized on a pixel-by-pixel basis. In another example, the image can be normalized using two or more wavelengths. In another example, the image can be normalized over different points in the same image. From the normalized data generated by 1606, properties such as alpha, other blood oxygenation analogues, the degree of blurriness, etc. may be calculated as described elsewhere herein.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of detecting a retinal disease of a tissue of an eye, the method comprising:
   (a) receiving from a detector reflected optical signals, wherein the reflected optical signals comprise at least a first reflected optical signal at a first wavelength range and a second reflected optical signal at a second wavelength range, wherein the first wavelength range and the second wavelength range are distinct, and wherein the reflected optical signals comprise a spatially varying component in at least one axis across a surface of the tissue of the eye;
   (b) normalizing the reflected optical signals to form normalized data, wherein the normalized data comprises a ratio of AC and DC components of the spatially varying component of the reflected optical signals at the first wavelength range and the second wavelength range across the surface of the tissue of the eye; and
   (c) determining at least one oxygenation parameter based on the normalized data, wherein the at least one oxygenation parameter comprises an analog of blood oxygenation of the tissue of the eye, wherein the at least one oxygenation parameter comprises a first oxygenation parameter determined at an optic disc of the eye and a second oxygenation parameter determined at one or more blood vessels of the eye away from the optic disc; wherein the retinal disease is detected in a response to a difference between the first oxygenation parameter at the optic disc and the second oxygenation parameter at the one or more blood vessels away from the optic disc.

2. The method of claim 1, further comprising determining a statistical significance of the first oxygenation parameter and the second oxygenation parameter.

3. The method of claim 1, further comprising providing the at least one oxygenation parameter determined based on normalized data to a clinician.

4. The method of claim 3, further comprising providing the at least one oxygenation parameter determined based on normalized data and secondary health data to the clinician; and incorporating the at least one oxygenation parameter and the secondary health data into a disease model, wherein the secondary health data comprises one or more of diet, family history, age, gender, and medical history.

5. The method of claim 1, wherein the method further comprises identifying a healthy tissue, or an indeterminate tissue disease state based on the at least one oxygenation parameter determined based on normalized data.

6. The method of claim 5, wherein the onset or the progression of the disorder related to retinal oxygenation is identified, and wherein the disorder comprises one or more of glaucoma, diabetic retinopathy, age-related macular degeneration, retinal vein occlusion, Alzheimer's disease, choroidal disorders, stroke, or cancer.

7. The method of claim 1, further comprising forming a 2D map of the at least one oxygenation parameter determined based on normalized data across the surface of the tissue.

8. The method of claim 1, wherein the first wavelength range is more sensitive to an absorption of hemoglobin than an absorption of deoxyhemoglobin and wherein the second wavelength range is about equally sensitive to the absorption of hemoglobin as the absorption of deoxyhemoglobin.

9. The method of claim 8 wherein the first wavelength range is at least about 5%, about 10%, or about 20% more sensitive than the second wavelength range to the absorption of hemoglobin.

10. The method of claim 1, wherein the normalizing in (b) comprises one or more of: normalization based on the first wavelength range and the second wavelength range, single pixel normalization, or two location-based normalization.

11. The method of claim 1, further comprising, prior to (b), performing a spatial Fourier transform on the reflected optical signals, thereby generating spatially transformed data, and performing the normalizing in (b) on the spatially transformed data.

12. The method of claim 1, wherein the at least one oxygenation parameter determined based on normalized data is related to a degree of blurriness of the tissue.

13. The method of claim 1, wherein the normalized data further comprises a ratio of the first reflected optical signal at the first wavelength range to the second reflected optical signal at the second wavelength range.

14. The method of claim 1, wherein the reflected optical signals are received from the detector in one or more snapshots from the tissue and normalizing is performed for a plurality of pixels of the one or more snapshots.

15. The method of claim 14, wherein the one or more snapshots is a single snapshot, and the at least one oxygenation parameter determined based on normalized data is determined using the single snapshot.

16. The method of claim 1, wherein the tissue is retinal tissue susceptible to occasional movement, rapid movement, or both, and wherein the method can be effectively performed in a presence of occasional movement, rapid movement, or both.

17. A device to detect retinal disease of a tissue of an eye, the device comprising:
    an optical source comprising at least a first wavelength range and a second wavelength range, wherein the optical source is configured to project an optical pattern on a surface of the tissue of the eye, the optical pattern comprising a spatially varying component in at least one axis across the surface of the tissue of the eye;
    a detector to collect reflected optical signals comprising a first reflected optical signal from the first wavelength range and a second reflected optical signal from the second wavelength range, wherein the first and the second wavelength ranges are distinct;
    a processor operatively coupled to the detector, the processor comprising a non-transitory computer readable storage medium comprising instructions, the instructions configured to:
        normalize the reflected optical signals to form normalized data, wherein the normalized data comprises a ratio of AC and DC components of the spatially varying component of the reflected optical signals at the first wavelength range and the second wavelength range across the surface of the tissue of the eye; and
        determine at least one oxygenation parameter based on the normalized data, wherein the at least one oxygenation parameter comprises an analog of blood oxygenation saturation of the tissue of the eye, wherein the at least one oxygenation parameter comprises a first oxygenation parameter determined at an optic disc of the eye and a second oxygenation parameter determined at one or more blood vessels of the eye away from the optic disc;
wherein the retinal disease is detected in a response to a difference between the first oxygenation parameter at the optic disc and the second oxygenation parameter at the one or more blood vessels away from the optic disc.

* * * * *